US010726653B2

(12) United States Patent
Belhadia et al.

(10) Patent No.: US 10,726,653 B2
(45) Date of Patent: Jul. 28, 2020

(54) SYSTEMS AND METHODS FOR REDUNDANT ACCESS CONTROL SYSTEMS BASED ON MOBILE DEVICES

(71) Applicant: ACSYS HOLDINGS LIMITED, Wanchai (HK)

(72) Inventors: Karim Belhadia, Shen Zhen (CN); Jean Mouradian, Shen Zhen (CN); David Meganck, Shen Zhen (CN); Ahmad Fares, Hamra (LB)

(73) Assignee: ACSYS HOLDINGS LIMITED, Wanchai (HK)

( * ) Notice: Subject to any disclaimer, the term of this patent is extended or adjusted under 35 U.S.C. 154(b) by 0 days.

(21) Appl. No.: 16/600,443

(22) Filed: Oct. 11, 2019

(65) Prior Publication Data
US 2020/0043261 A1 Feb. 6, 2020

Related U.S. Application Data

(63) Continuation of application No. 15/991,556, filed on May 29, 2018, now Pat. No. 10,482,694, which is a
(Continued)

(51) Int. Cl.
*G07C 9/00* (2020.01)
*G07C 9/25* (2020.01)
(Continued)

(52) U.S. Cl.
CPC ............ *G07C 9/257* (2020.01); *G06F 21/32* (2013.01); *G06F 21/35* (2013.01); *G07C 9/0069* (2013.01);
(Continued)

(58) Field of Classification Search
None
See application file for complete search history.

(56) References Cited

U.S. PATENT DOCUMENTS 10,013,825 B2 * 7/2018 Belhadia ............... H04W 12/06
2009/0085717 A1 4/2009 Myers
(Continued)

FOREIGN PATENT DOCUMENTS

CN 201310243 9/2009
TW 201348568 1/2013

*Primary Examiner* — K. Wong
(74) *Attorney, Agent, or Firm* — Bryan Cave Leighton Paisner LLP

(57) ABSTRACT

Systems and methods for providing redundant access control systems are disclosed. According to some embodiments of the invention, the systems and methods include a smart lock that provides redundant access control. The smart lock includes a button that has a plurality of redundant access channels for receiving authentication information. The redundant access channels may include a biometric scanner for receiving biometric information, a passcode keypad for entering a token, or a wireless transceiver for receiving a token from a mobile device and transmitting a response to the mobile device. When the user cannot open the lock through the first redundant access channel, the smart lock is configured to allow access through a second access channel. In some embodiments, the button is a freely rotating button that translates the rotational energy into electrical energy using, for example piezo elements, to energize a rechargeable power source, such as a capacitor bank.

20 Claims, 21 Drawing Sheets

Related U.S. Application Data continuation of application No. 15/060,327, filed on Mar. 3, 2016, now Pat. No. 10,013,825.

(60) Provisional application No. 62/127,366, filed on Mar. 3, 2015.

(51) Int. Cl.
| | |
|---|---|
| *H04L 29/06* | (2006.01) |
| *H04W 12/06* | (2009.01) |
| *G07C 9/23* | (2020.01) |
| *G06F 21/32* | (2013.01) |
| *G06F 21/35* | (2013.01) |
| *G07C 9/26* | (2020.01) |

(52) U.S. Cl.
CPC ..... *G07C 9/00309* (2013.01); *G07C 9/00563* (2013.01); *G07C 9/00571* (2013.01); *G07C 9/23* (2020.01); *H04L 63/083* (2013.01); *H04L 63/0861* (2013.01); *H04W 12/06* (2013.01); *G07C 9/26* (2020.01); *G07C 2009/00634* (2013.01)

(56) References Cited

U.S. PATENT DOCUMENTS

| | | |
|---|---|---|
| 2010/0176919 A1 | 7/2010 | Myers et al. |
| 2012/0096491 A1 | 4/2012 | Shkedi |
| 2012/0280790 A1 | 8/2012 | Gerhardt et al. |
| 2014/0375422 A1 | 12/2014 | Huber et al. |

\* cited by examiner

SYSTEMS AND METHODS FOR REDUNDANT ACCESS CONTROL SYSTEMS BASED ON MOBILE DEVICES

CROSS-REFERENCE TO RELATED APPLICATIONS

The present application is a continuation application of U.S. patent application Ser. No. 15/991,556 filed on May 29, 2019, which is a continuation application of U.S. patent application Ser. No. 15/060,327 filed Mar. 3, 2016, which claims priority to U.S. Provisional Patent Application No. 62/127,366 filed on Mar. 3, 2015, each of which is incorporated herein by reference in its entirety.

FIELD OF THE INVENTION

The present invention is related to locks and mobile devices, and more particularly, to systems and methods for controlling access to locks using mobile devices and redundant channels of access controls.

BACKGROUND

Access control systems that use mechanical or mechatronic keys and locks continue to suffer from several drawbacks. Specifically, mechanical locks and keys do not offer robust protection against theft, loss, unlawful entry, or unwanted copying. For example, where a key is lost or stolen, the lock would typically be replaced. Mechanical locks and keys also do not provide near real-time information about how or when the keys were used—if at all. This type of information may be highly desirable for individuals and potentially critical for some businesses. Systems that use electronic lock and key systems to provide access information are typically hard-wired into a door frame. Moreover hard-wired solutions are entirely dependent on a direct or alternative form of power supply and data connection to function efficiently. Hard-wired systems are generally expensive to install, perform poorly in outdoor environments where temperature range varies greatly, and are incompatible with universal systems, such as the Europrofile cylinder. Still further, most traditional mechanical lock systems use keys that may only be used to access one door, and therefore, users who need access to multiple locks are inconvenienced by having to carry a bundle of different keys for their corresponding locks.

The wireless communication capabilities of mobile devices, such as for example NFC and Bluetooth, provide an opportunity to improve access control systems that use mechanical or mechatronic keys. Specifically, the near field communication (NFC), Bluetooth, or similar wireless capabilities of mobile devices can be adapted for access control systems by using the mobile device as an electronic key. Further, the capability to communicate access data in near real-time on some mobile devices presents an opportunity to transfer information about how and when keys are used and locks are opened.

However, integrating mobile devices into access control systems still presents several drawbacks. As with mechanical lock and key systems, mobile devices do not offer robust protection against theft or unlawful entry. Further, mobile devices typically rely on batteries as their power source, which often lose their charge before a user opens a lock. Moreover, mobile devices can be costly and impracticable for some businesses to implement across all of their assets.

Additionally, to integrate mobile devices into access control systems, locks are generally equipped with NFC and wireless communication devices. However, these devices require a continuous and reliable source of power. While battery power supplies have been suitable for NFC or wireless devices, like mobile devices, they may lose charge or suffer from other failures unexpectedly, leaving a user without the ability to open the lock via the mobile device.

Accordingly, what is needed is an access control system that is a secure and reliable alternative to mechanical locks, as well as mobile devices that provide redundant channels of access while providing usage information in near real-time, and provide redundant supplies of power in case of failure or discharge. The access control system should be easy to install, reduce the number of wired connections utilized, and function autonomously for prolonged periods of time. The redundant channels of the access control system should allow users both with and without access to normal phones, smartphones, tablets, and similar mobile devices to access the lock.

SUMMARY OF THE INVENTION

In various embodiments, the invention provides systems, methods, and apparatuses for controlling and monitoring an access control system. According to some embodiments of the invention, an access control system includes a smart lock that provides redundant access control. The smart lock includes a storage medium, a power source, a hardware processor, a cylinder having a cam that engages a bolt, and a button that engages the cam to unlock the bolt.

The button includes a plurality of redundant access channels for receiving authentication information. The redundant access channels may include a biometric scanner for receiving biometric information, a passcode keypad, and/or a wireless transceiver for receiving a token from a mobile device and transmitting a response to the mobile device.

The smart lock is configured to validate authentication information received from the passcode keypad, biometric scanner, and/or mobile device based on a set of rules determined by an administrator, and unlock the bolt if a user is authenticated through a first channel of the plurality of redundant access channels. If a user cannot open the smart lock through the first channel, the smart lock is enabled to allow access through a second channel of the plurality of redundant access channels. In this way, when a user can no longer access a smart lock using a first channel, the user may open the lock using a second channel.

Access control systems may include one or more smart locks. The systems may be accessed by users who request access to the smart locks, and controlled by masters or administrators who restrict access to the smart locks. In some embodiments, users may access, and masters or administrators may control access to smart locks from their respective mobile devices in near real-time. Masters and administrators may use mobile devices to configure rules and access rights that control how and when a user may open a smart lock. In this way, an access control system may be provided that allows masters and administrators to control and monitor users in near real-time, without having to install hard-wired internet or data connections onto a door or lock. Because the cylinder is adaptable to fit standard slots, door frames and lock systems do not need to be modified or retooled.

In some aspects of the invention, masters or administrators may configure rules and access rights that restrict how users access smart locks. Access rights specify which locks users may access, and the configurable rules specify conditions that must be fulfilled before opening the smart lock. The rules thus allow a master or administrator to restrict a user's access based on location and time. In this way, a master or administrator is enabled to precisely control how a user may open a smart lock.

Masters and administrators may require users to request a passcode or token each time an attempt is made to open the smart lock. When a user submits a request, a master or administrator may receive the request in near real-time and determine whether to grant the user access. The master or administrator may require the user provide additional authentication information, such as a password, to ensure the identity of the user. If the master or administrator determines to grant the user access, a token or passcode is transmitted to the user in near real-time. In some embodiments, the requests may be sent based upon a triggering event. Thus, a master or administrator may control a user's access on a case-by-case basis.

Passcodes may be fixed or dynamic. Dynamic passcodes enable masters or administrators to grant users single-use or time limited access to locks. Passcodes may be provided to the lock wirelessly from a mobile device or manually entered onto a keypad. Thus, users are enabled to gain access to a lock with a passcode even if their mobile device is unavailable.

According to some embodiments of the invention, the lock includes a rechargeable power source. The button may be a freely rotating button that generates rotational energy when the button is turned, and energizes the rechargeable power source. The lock may use piezo elements or an armature and electrical generators to translate the kinetic energy into storeable electrical energy for storing in the rechargeable power source.

BRIEF DESCRIPTION OF THE FIGURES

The objects and features of the invention can be better understood with reference to the following detailed description and accompanying figures.

DESCRIPTION OF THE INVENTION

Embodiments of the present invention include systems, methods, and apparatuses that enable users to open locks using redundant access channels, and allows masters or administrators to control a user's access in near real-time.

Figure 1A:
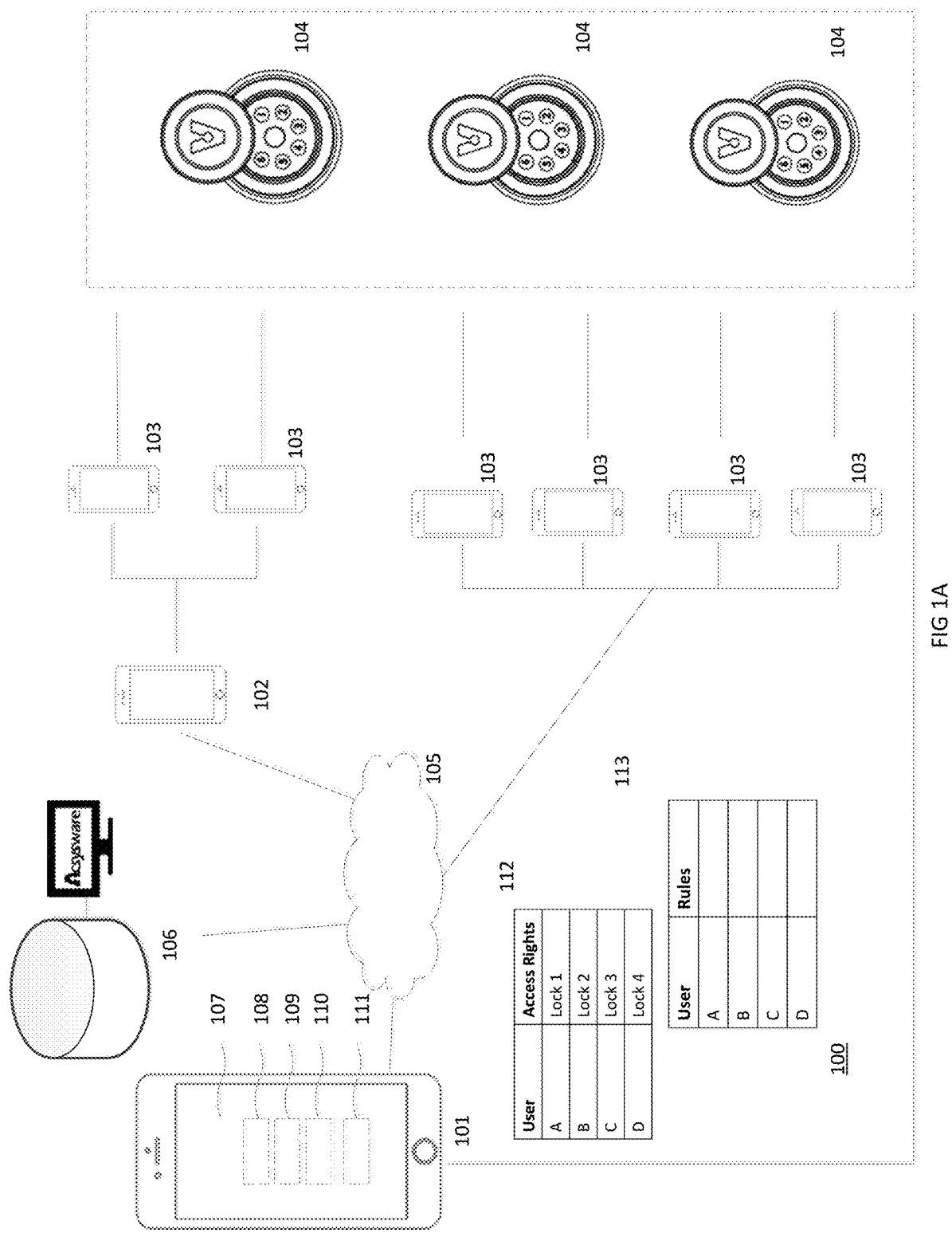
FIGS. 1A and 1B show access control systems according to embodiments of the invention.
Figure 1B:
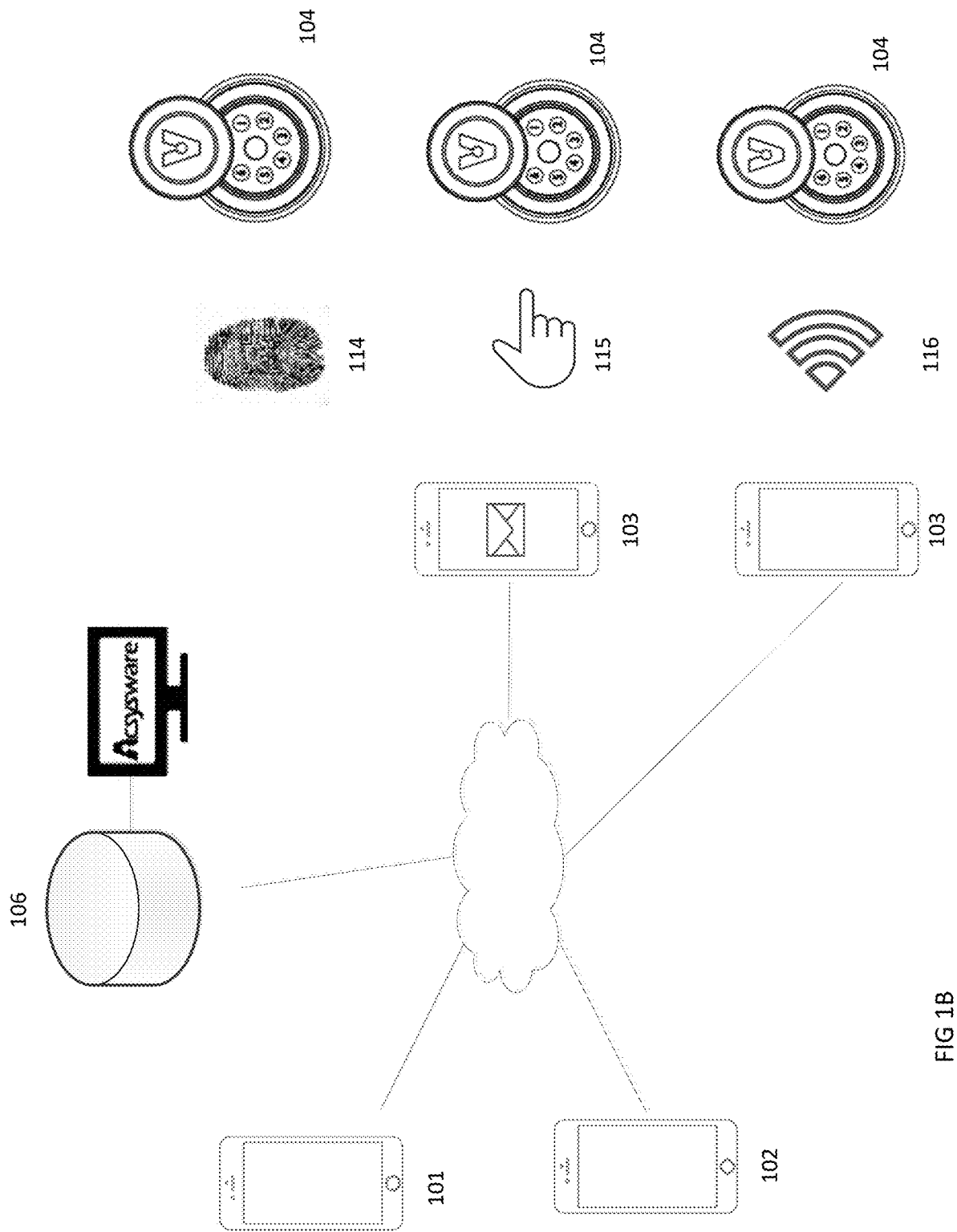

An exemplary access control system that provides redundant channels of access to users while communicating usage information in near real-time is shown in FIGS. 1A and 1B. The system includes one or more smart locks 104, a central access server 105, and devices 101, 102, and 103 for accessing and controlling the smart locks. Users open the smart locks 104 through one or more access channels as described in more detail below. Masters and administrators control how the users access the smart locks 104 from a master device 101 or administrator device 102. Users may communicate with masters, administrators, and open smart locks from a user device 103. Users may also open smart locks manually, without any need for a user device 103. A central access server 105 relays and stores information exchanged between a user and a master or administrator in near real-time. It is noted that "near real-time" communications are communications that may appear as occurring in real-time or substantially in real-time, but experience slight, unnoticeable or insignificant delays due to network infrastructure. When a user can no longer open a smart lock through one of the access channels because, for example, the access channel is unavailable or becomes inoperable, a user can open the smart lock through the other available access channels. Thus, the access control system 100 enables users to open smart locks using redundant access channels, and allows masters or administrators to control a user's access in near real-time.

The master device 101 and administrator device 102 create and assign rules and access rights to users seeking to obtain access to one or more smart locks 104. Access rights identify the smart locks 104 that each user is authorized to open. Rules add conditions that must be met before a user is allowed to open a smart lock 104. For example, access rights may be configured by a master device 101 or administrator device 102 to specify a group of smart locks 104 a user may open, while rules specify what day and time the user is allowed to open the particular smart lock.

As shown in FIG. 1B, master devices 101 and administrator devices 102 are also configured to specify which access channels a user may use to provide authentication information to open a smart lock 104. As explained in more detail below, an access channel may be for example, scanning biometric information into a biometric scanner 114, entering a passcode on a keypad 115, or wirelessly transmitting a token from a mobile device 116. The smart lock may provide a combination of any or all access channels to the user. For example, a first access channel for regular or default use may be wirelessly communicating a token from a user's mobile device 116, and a second and third access channel may be the biometric scanner 114 passcode keypad 115, respectively, for use in the event that the first access channel becomes unavailable to the user.

The master device 101, administrator device 102, or user device 103 may be mobile device, a software service, or a software application. Mobile devices may be for example, a smartphone, tablet, or handheld. Mobile devices include a touchscreen display 107, storage medium 108, and processor 109. In some embodiments, mobile device includes a wireless transceiver 110 for receiving and transmitting RFID, NFC or Bluetooth signals, or over the mobile device's cellular or internet connection.

Central access server 105 may be a cloud-based server and may connect to a remote server 106. Remote server 106 may include a call center with agents for receiving user calls and access requests.

In some embodiments of the invention, the mobile device includes an NFC element 111 which may be a SIM or SD card that is equipped with an NFC transmitter. An NFC-enabled SD card may be placed into the SD card slot of the mobile device, providing a smartphone with NFC communications capability. Similarly, an NFC-enabled SIM card may be placed into the SIM card slot of the mobile device, providing a smartphone with NFC communications capability.

As shown in FIG. 1A, individuals in the access control system may have different roles. For example, an individual may be a master, administrator, or user. A master can add, remove, and configure access rights of administrators or users. Administrators can similarly add, remove, and configure access rights of users. Users are the individuals who seek access to a site secured by a smart lock. The access rights for individuals may be configured for each user or administrator, or at a more general level for a group of users or administrators. Similarly, a user or administrator may be given access to a specific smart lock, or for a group of smart locks.

For example, in a commercial setting of the access control system, the master device 101 or administrator device 102 may be operated by supervisors or managers who wish to control how and when their employees access areas within a business. A business manager may designate a supervisor as an administrator, who can further designate one group of employees as users with access to a particular group of smart locks. As another example, in a residential setting the master device 101 or administrator device 102 may be operated by parents to control access to, and monitor access information of, people entering different areas of their house. Parents designating themselves as masters could designate their babysitters as administrators and their children as users, and specify which areas of the house the babysitters and children may access and how or when they may access them. As described in more detail below, the supervisors or parents may receive alerts or reports of how and when the employees, babysitters, or children attempted to access the sites controlled by the smart locks 104.

The master or administrator of the access control system configures how users open smart locks with a set of rules 112 and access rights 113. The access rights 113 identify each individual or group of individuals in the access control system, and each smart lock or group of smart locks in the access controls system. The access rights 113 also associate each individual with a smart lock. The set of rules 112 specify what access channels can be used to open the smart lock, and what (if any) conditions are required to enable the individual to open the smart lock. For example, parents designating themselves as masters may configure the access rights and rules for babysitters such that they may open a smart lock using the passcode, or biometric scan. The rules may further be configured with conditions such that the babysitter may only open the smart lock on certain days of the week, or after the parents approve each request for access.

The access rights and rules may be stored in the mobile device of the master, administrator, user, smart lock, or central access server. As explained in more detail below, a master or administrator may create, modify, or delete access rights and rules from a master device 101, an administrator device 102, or the central access server 105. When a master or administrator creates, modifies, or deletes an access right or rule, the access right or rule may be communicated to the central access server or mobile device of the user. The mobile device of the user may then transmit the access right or rule to the smart lock as part of the token. When a user attempts to open the smart lock, the access rights and rules may be checked from the mobile device or smart lock. For example, if the user provides a passcode or biometric scan, the smart lock may check the access rights and rules to determine if a user is authorized to open a smart lock on a given day or time. As another example, before transmitting a token to a smart lock, the user's mobile device may check the access rights and rules to determine if the user is authorized to open a particular smart lock. If the user does not have authorization, the mobile device will not transmit the token to the smart lock. In some embodiments of the invention, the access rights and rules may be checked from the master device 101, administrator device 102, or central access server 105.

Smart locks may be installed to secure specific areas or rooms within a site, enabling the master or administrator to precisely control where an individual may gain access. For example, in a cell tower, smart locks may be installed on the front door of a facility, a door of a storage room, and a door of a cabinet, where batteries, copper cables, electronic equipment and other assets that are commonly a target for theft are secured. A business manager (e.g., master) may then grant certain employees (e.g., users) access to the facility, while restricting access to the storage room and cabinet door to a select few employees. As described above, the business manager may further configure rules to specify how the employees access the smart locks, and what (if any) conditions enable the employee to obtain access.

As another example, the areas within a site may be, for example, a basement, backyard, bedroom, front gate, fitness center, or garage. Thus, in the residential setting a parent may enable a babysitter to access a basement, backyard, or the parent's bedroom, but only during the specific time interval that the babysitter is babysitting. As described below, the parent may further configure the rules to grant the babysitter conditional access rights that require the babysitter to request permission each time he or she seeks access to a smart lock. Parents may further configure the access rights and rules to grant children access to different areas or rooms within the home, and under heightened restrictions. For example, the parent may configure the access rights and rules to deny children access to rooms in the house, such as the basement, or restrict access to areas such as the fitness center during a specific time of day. Parents may further configure the rules to specify which access channels the children may use to access the area, such as for example, using the child's fingerprint to access a backyard.

According to some embodiments of the invention, a user opens one or more smart locks 104 by wirelessly communicating 116 from the user's mobile device to the smart lock. By using the wireless capabilities of the user's mobile device, the smart lock 104 may be linked to the central access server 105 without a direct connection between the two. In this way, access to a smart lock 104 may be controlled remotely and without the need for implementing a hard-wired system on a door frame or lock.

As described above, smart lock 104 may be opened by wirelessly transmitting a token from the user's mobile device to the smart lock 104. A token contains a passcode that includes letters, numbers, symbols, or any combination thereof. The passcode may be dynamic or fixed, as discussed in more detail below. A smart lock 104 validates the token based on access rights and rules determined by the master or administrator and by comparing the received passcode with a passcode produced by a process stored in the smart lock 104. If the received passcode matches the passcode produced by the process, the smart lock 104 will accept the token. The smart lock 104 communicates to the user's mobile device 103 whether the token has been validated based on the access rights and rules and whether it matches the token produced by the stored process. This information may then be sent from the user mobile device 103 to the central access server 105, where it may be relayed as a notification or alert to a master device 101 or administrator device 102.

Master devices 101 and administrator devices 102 are configured to specify whether a user can access a smart lock 104 with the wireless capabilities of the user's mobile device, and what access rights the user has. For example, the master devices 101 and administrator devices 102 may specify whether a user's access rights to a particular smart lock 104 or group of smart locks 04 are fixed or conditional.

Conditional access rights allow a master or administrator to approve each attempt by a user to open a smart lock 104. For example, when a user with conditional access rights attempts to access a smart lock 104 or group of smart locks 104, the system will alert a master device 101 or administrator device 102 that the user 103 is seeking access to the smart lock 104, and in near real-time request the master device 101 or administrator device 102 to grant the user access to the smart lock 104. The user may then determine whether to grant or deny the user access. The determination may be based on additional conditions or verification steps. For example, the master or administrator may request the user provide identification information that proves the user's identity or authenticity, such as for example, an additional password. As another example, the master of administrator may deny the user access because the user was not intended to access that particular smart lock 104, or was not intended to have access on that particular day or time. If the master or administrator determines the user's access to the smart lock 104 should granted, the master device 101 or administrator device 102 may then provide the user with a token as described in more detail below. If the master or administrator determines the user's access to the smart lock 104 should be denied, the master device 101 or administrator device 102 does not provide the user with a token, and the user will be unable to open the smart lock 104. In this way, a master device 101 or administrator device 102 may allow or deny access to a smart lock 104 in near real-time. In some embodiments, when the master or administrator determines whether to grant or deny the user access, the master device 101 or administrator device 102 sends an alert to the user notifying the user that their request for access has been granted or denied.

Fixed access rights allow users to obtain access to a smart lock 104 without first receiving approval from a master device 101 or administrator device 102. For example, a user may be granted fixed access rights to open a particular smart lock 104 without restriction. Such fixed access may be provided with a fixed passcode, for example, which a user may enter on the keypad of the smart lock 104. The user may then open the smart lock 104 with the fixed passcode without first requesting approval from a master device 101 or administrator device 102. In some embodiments the user's mobile device 103 may still inform the master device 101 or administrator device 102 when a user with fixed access rights has accessed or attempted to access a smart lock 104. For example, after a user enters a fixed passcode on the smart lock keypad, the smart lock may communicate to the user's mobile device that it received a valid fixed passcode and unlocked the smart lock. The user's mobile device may then notify a master device 101, administrator device 102, or central access server 105, in near real-time that the user accessed and unlocked the smart lock 104.

The master device 101 and administrator device 102 may also be used to allow a user to open one or more smart locks 104 with a passcode entered on a keypad 115 or biometric scan 114. These access channels enable a user to obtain access to a smart lock 104 without using a mobile device, because as described in more detail below, a passcode or biometric scan may be manually input by the user. In this way, a user may obtain access to a smart lock 104 in the event they do not own a mobile device, or their mobile device is lost, broken, or otherwise incapable of transmitting a token wirelessly to the smart lock 104. Thus, according to some embodiments of the invention, the keypad for entering a passcode or biometric scan serve as redundant access channels that provide the user with access to the smart lock 104. In other embodiments of the invention, the keypad for entering a passcode or biometric scan may serve as a primary or default access channel, and wirelessly communicating from the user's mobile device to the smart lock 104 may serve as the redundant access channel. In yet further embodiments of the invention, users may be required to authenticate themselves using a combination of alternative access channels. For example, a user may be required to provide a combination of a dynamic passcode and a fingerprint before being granted access to a lock.

As described above, a token may include a passcode that may be wirelessly transmitted from a user's mobile device 103 to a smart lock 104. As described in more detail below, the passcode may also be displayed on the user device so that the user may manually enter it onto the keypad of the smart lock 104. A smart lock 04 validates the fixed passcode by comparing the entered passcode to passcodes generated by processes stored on the smart lock 04. If the process generates a matching passcode, the smart lock 104 will grant the user access.

In some embodiments of the invention, the passcode may be a dynamic passcode generated by a Code Generation System (CGS). A dynamic passcode is a unique, single-use, time-limited or one-time passcode that is generated by the central access server upon request. The passcode is based in part on the time the passcode was requested.

According to some embodiments of the invention, the generation of the passcode provided to the user is based on unique information about the user's mobile device and the time the passcode is requested or being generated. For a mobile device, the passcode may be based on, for example, the International Mobile Equipment Identity ("IMEI"), the network ID of the mobile device, or a combination of the two IDs, and the time the request was sent from the mobile device.

Alternatively, the passcode may be fixed. A fixed passcode does not change or expire, may be used more than once, and may be obtained without request from a master or administrator. Masters or administrators who wish to prevent fixed passcodes from being compromised may require fixed passcodes to be used in conjunction with other information or a biometric scan.

A user may request a dynamic or fixed passcode by contacting a master or an administrator. For example, the user's mobile device 103 may include a mobile application that allows the user to send a request for a passcode to a master device 101, administrator device 102, or central access server 105, over the mobile device's cellular data, WiFi or NFC/Bluetooth connection. As another example, a user may submit a request by placing a voice call or sending a text message to a master, administrator, or central access server agent from the user's mobile device. In this way, a user may send a request even when the mobile device is unable to connect to the internet, or is not equipped with a data or internet connection.

In some embodiments of the invention, smart lock 104 may be opened by providing a biometric scan of a user. As described in more detail below, smart locks 04 include a storage medium 201 that may store biometric data for each user that was granted access to the lock. Biometric data may include, for example, fingerprints of each user. When the user receives a biometric scan, the smart lock 104 compares the scan to the biometric data stored at the smart lock 104. If the scan matches the stored biometric data, the smart lock will grant the user access. When the biometric scanner is used as a redundant access channel, a user may provide a biometric scan if, for example, the user does not have or loses his or her mobile device and is incapable of obtaining a token or passcode.

Figure 2A:
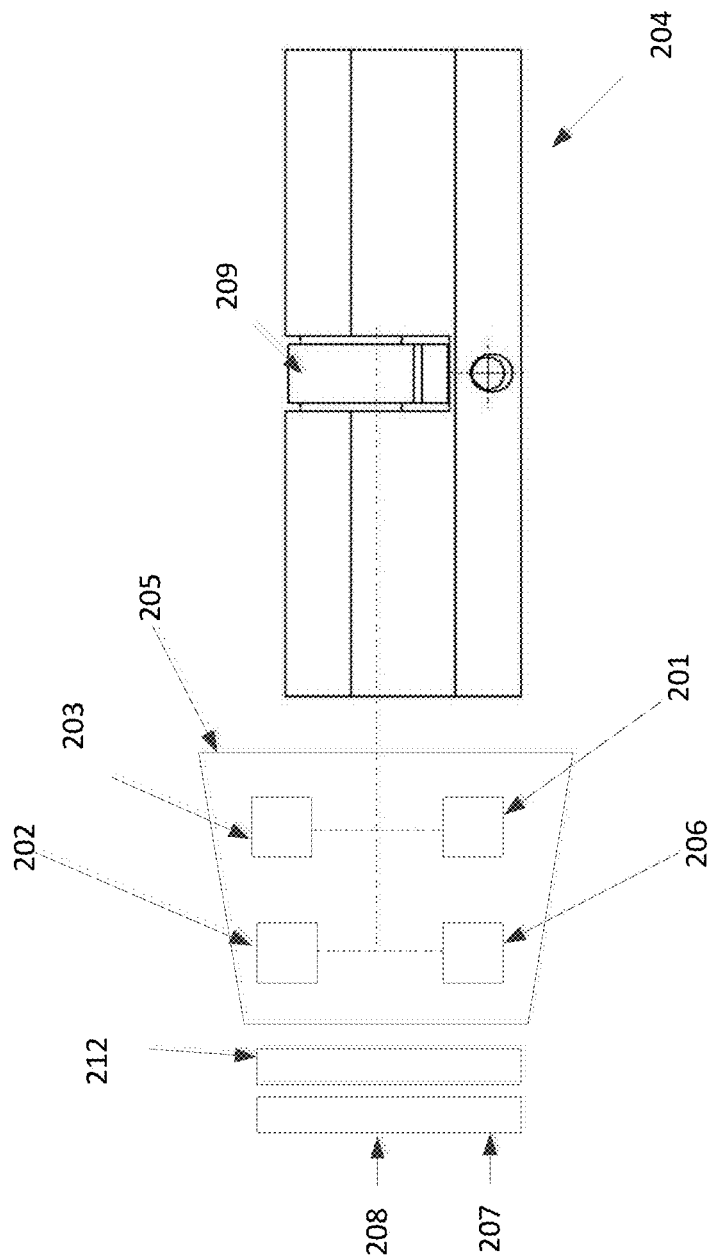
FIGS. 2A, 2B, and 2C show smart locks for use in access control systems according to embodiments of the invention.
Figure 2B:
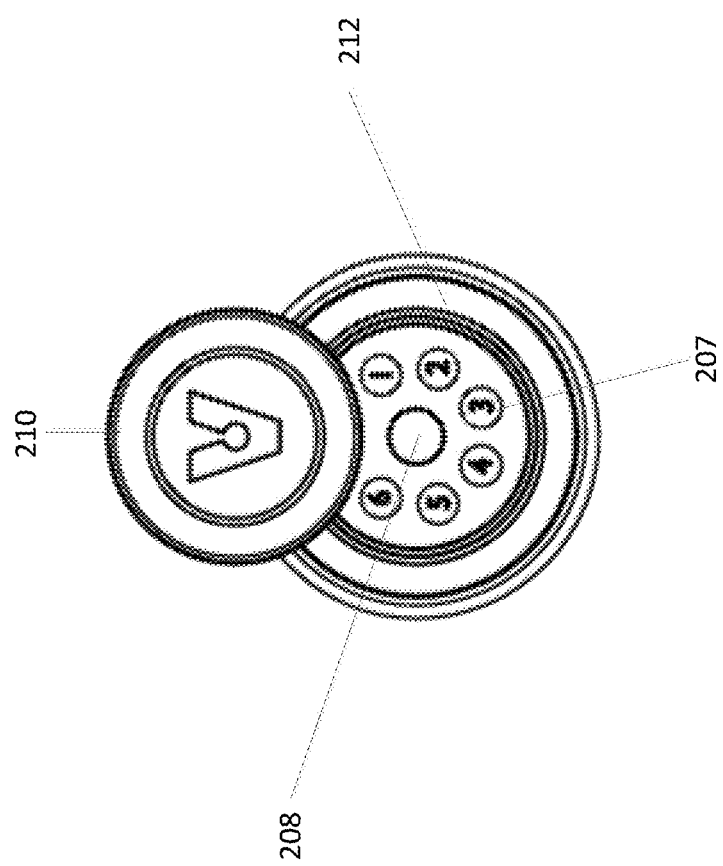

FIGS. 2A and 2B show a smart lock according to some embodiments of the invention. The smart lock includes a storage medium 201, a power source 202, a hardware processor 203, a cylinder 204, and a button 205. The smart lock may also include a wireless transceiver 206, a passcode keypad 207, and a biometric scanner 208. The cylinder includes a cam 209 that engages a bolt (not pictured). A user provides authentication information to the smart lock, which is validated by the hardware processor 203 and storage medium 201. Authentication information may be, for example, a user's scanned fingerprint, a passcode entered onto the keypad, or a token wirelessly transmitted from the user's device. When the smart lock validates the authentication information, the button 205 engages the cam 205, which unlocks the bolt. Storage medium 201 stores information and data for validating authentication information, keeping logs of access events and smart lock usage, and identifying the smart lock. For example, the storage medium may store biographic data of users authorized to open the lock or unique identification numbers that identify the smart lock.

The hardware processor 203 is configured to validate authentication information received from the access channels based on the access rights and rules determined by a master or administrator. The hardware processor may unlock the bolt when a user is authenticated through an access channel. In one aspect of the invention, when the first redundant access channel becomes unavailable to the user, the hardware processor 203 is configured to allow access through a second redundant access channel to unlock the bolt.

In some embodiments, the smart lock includes a wireless transceiver 206 for receiving and transmitting RFID, NFC or Bluetooth signals to a user's mobile device. As described above, a user may wirelessly transmit a token to a smart lock 104. When the wireless transceiver 206 receives the token, the smart lock validates the token as described above. The wireless transceiver may also communicate access information to the user's mobile device. Access information provides details about access events, such as which users have accessed the smart lock and when they were accessed. Access information may be stored in the smart lock's storage medium 201. Access information is stored at the smart lock until a mobile device accesses the lock, at which point the smart lock will transmit the access information to the user's mobile device. The mobile device will then communicate the access information to the central access server. When the user's mobile device is stolen or unable to receive wireless communications, the smart lock will wait until the next capable mobile device attempts to access the smart lock.

The smart lock cylinder 204 is adaptable to fit a standard profile slot. In some embodiments of the invention, the cylinder 204 of the smart lock is a Europrofile (or "Euro DIN") design. In other embodiments, the cylinder may be an oval, round, Scandinavian, Japanese, Union or Schlage type of profile. However, where Europrofile cylinders typically include a rotatable knob on the inside of the door for engaging or disengaging a bolt, the smart lock instead has a freely rotating button 205. The freely rotating button 205 may be spun several times around its axis, in contrast to knobs which are typically rotated a half- or quarter-turn to engage or disengage a bolt. As explained in more detail below, spinning the freely rotating button 205 generates rotational energy that may be used to energize and recharge the power source 202 inside the lock for several days.

When the user's authentication information has been validated, the smart lock is enabled to engage the bolt. Specifically, the button 205 may be pushed inwards activating a clutch that engages the cam 209. As the user continues to rotate the button 205, the cam 209 moves the bolt from a locked position to an unlocked position. The user will not be able to open the smart lock until he or she has been authorized to access a site (for example, by wirelessly transmitting a token, providing a biometric scan, or entering a passcode on a keypad). Until the user has been authorized, the button is freely rotating, and will not engage the cam.

As shown in FIG. 2A, the button is disposed at the end of the cylinder facing the outside. In one aspect of the invention, the smart lock uses a single button, which enables the smart lock to be adapted for different sizes or lock formats. For example, the freely rotating button 205 may also be adapted for single-entry locks, button entry locks, double entry locks and padlocks. Padlocks, for example, may only include a freely rotating button without requiring an interior knob.

FIG. 2B shows a front view of the cylinder according to some embodiments of the invention. The button may include several access channels, such as a passcode keypad 207 and biometric scanner 208, which may be concealed by a cap 210. In situations where a user cannot unlock a door using their mobile device to wirelessly transmit a token (e.g., a user's mobile device is stolen or the device's batteries have been drained), the user may gain access by using a numeric keypad to enter a passcode, or by using a biometric scanner.

Figure 2C:
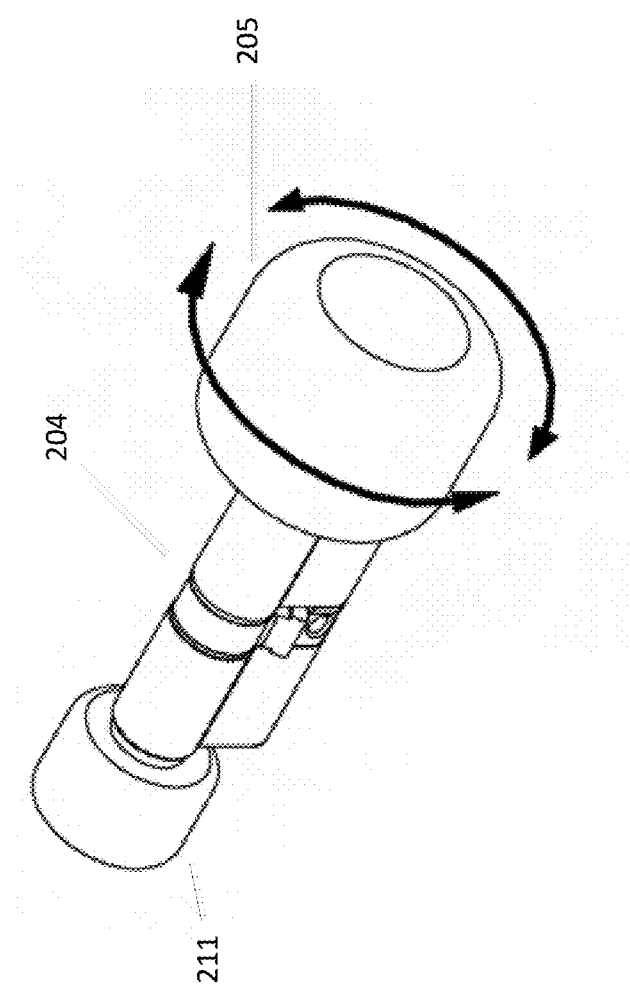

As FIG. 2C shows, the smart lock includes a knob or second button 211 disposed at the opposite end of the cylinder 204 facing the inside, according to some embodiments of the invention. The outer button 205 may have a longer radius and larger thickness than the interior button 211, which as explained in more detail below, may reduce the force or speed that is needed to rotate the button and charge its internal power sources. In embodiments where the smart lock includes an interior button 211, the interior button 211 may engage or disengage the bolt without the need to provide authentication information to the smart lock or requesting access from a master or administrator. Thus, a user may lock or unlock the door to exit the inside of a site at any time.

As explained above, the tokens communicated by the mobile devices may contain a passcode, such as a dynamic passcode for single-time usage. In one aspect of the invention, the passcode may be generated and communicated from the mobile device automatically such that no interaction is required from the user. Specifically, a user's mobile device may determine or detect it is in the vicinity of a smart lock. For example, using the location-based capabilities of the mobile device, the mobile device may determine that the user is approaching a site. In some embodiments, the determination may be aided by analyzing past user patterns, and infer that the user is returning home from work and is on his or her way to open their home door. The mobile device may alternatively make this determination by using its NFC/Bluetooth or wireless capabilities. Upon detecting the lock, the mobile device may identify the lock and the site that the lock secures. The mobile device may then automatically communicate this information to the central access server to determine if the user is allowed to access the smart lock. If the user meets all the conditions for accessing the lock (e.g., the user is allowed to access the lock at the particular time and day), then the access control system will generate a dynamic passcode. The dynamic passcode may be generated at a master device, an administrator device, or the central access server and then transmitted to the mobile device, or alternatively, it is generated by a mobile application on the mobile device of the user. The mobile device may then transmit the passcode to the smart lock, which validates the passcode using a process stored in the lock. Once the passcode has been validated, the user may push the button inwards and engage or disengage the bolt using a clutch system. If the user is not allowed to open the lock, the administrator will receive a notification that an unauthorized user attempted to open the lock.

According to some embodiments of the invention, the button includes a light indicator 212 that changes color based on the mode of operation. For example, if authentication information has been accepted, the lighting glows green; if authentication information has been rejected, it glows red; in standby mode it glows blue.

Figure 3:
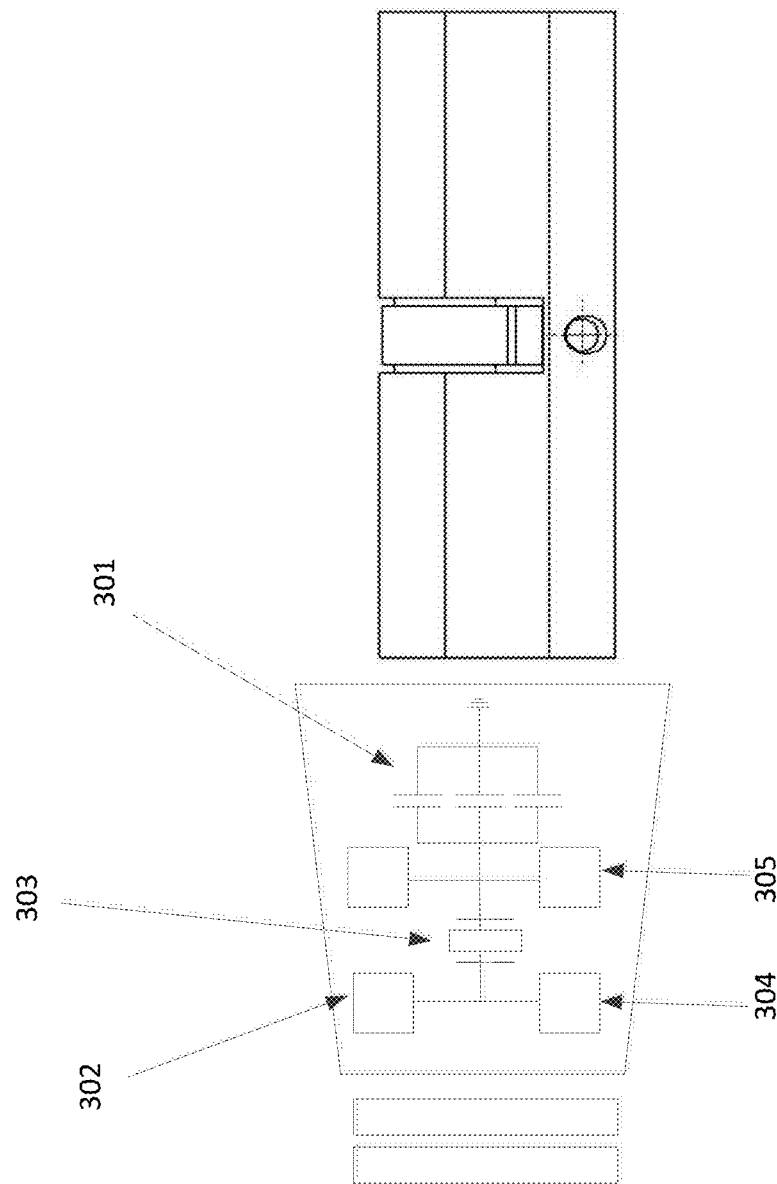
FIG. 3 shows a smart lock with rechargeable power sources according to embodiments of the invention.

As described above, the smart lock is powered by power source 202. In some embodiments of the invention, the button includes redundant power sources, as shown in FIG. 3. The redundant power sources may be used to energize the storage medium, wireless transceiver, and lighting indicator, in the event that one of the power sources fail. A redundant power source may be, for example, a bank of capacitors or batteries 301 located inside the button. When the batteries or capacitors are low on charge, the button may communicate this information to the next mobile device that accesses the lock. The mobile device may then communicate this information to a master or administrator. Alternatively, a low charge or battery level may be communicated using the color indicators.

In other embodiments, the button has a bank of capacitors 301 that are charged by the rotational movement of the button. The energy stored by the rotational movement is sufficient to last for several days, and provides a convenient, reliable, and redundant source of power should another power supply (e.g., batteries) fail. The button freely rotates about its central axis generating a high level of kinetic energy. Whereas some knobs are limited to quarter or half-turns, the button may be spun a full revolution. Similar to the winding of a crown on a watch, the rotational movement of the button is harvested and translated by elements inside the button into electrical energy, and stored for future use. The greater the number of revolutions the button is spun, the higher the charge that is stored inside the lock. In one exemplary embodiment, the rotational movement of the button drives a series of gears and springs 302 that transfer the rotational energy generated by turning the button. Because the springs and gears 302 inside the lock may be smaller than the button, the button can be spun at a lower speed and torque. Thus, the amount of force to energize the lock may be reduced by proportionately tailoring the size of the button to the gears and springs inside the lock.

In other embodiments, the rotational movement of the button is applied to a piezo element 303. When a user rotates the button, the rotational movement of the button is applied to a piezo element that generates piezoelectricity which is then transferred and stored in a capacitor bank or battery as charge. The piezoelectricity may be generated by strain, tension, or torsion from the spinning of the button. The strain, tension, or torsion is applied to the piezo element and creates electric charge that may be stored in a capacitor bank. In other embodiments, piezoelectricity may be generated by converting the rotational movement into vibrational energy. Specifically, the gears or springs inside the button may come into contact with a piezo flap that vibrates with every turn of the button.

In other embodiments, the rotational movement may additionally be converted into electrostatic or electromagnetic energy. For example, the rotation of the button may be used as the mechanical energy that rotates an armature in an electrical generator 304. In further embodiments, the rotational movement of the button may be stored in a spring or similar mechanical device.

Although FIGS. 2A-C and 3 depict several components inside the button, in other embodiments of the invention, these components may be placed outside of the button. For example, the wireless transceiver, memory, hardware processor, and capacitor/battery bank may be disposed outside of the cylinder and button in a lock case. These components may be coupled to the button through the cylinder. In other embodiments, these components may be inside the cylinder core, or inside a door rose.

Figure 4:
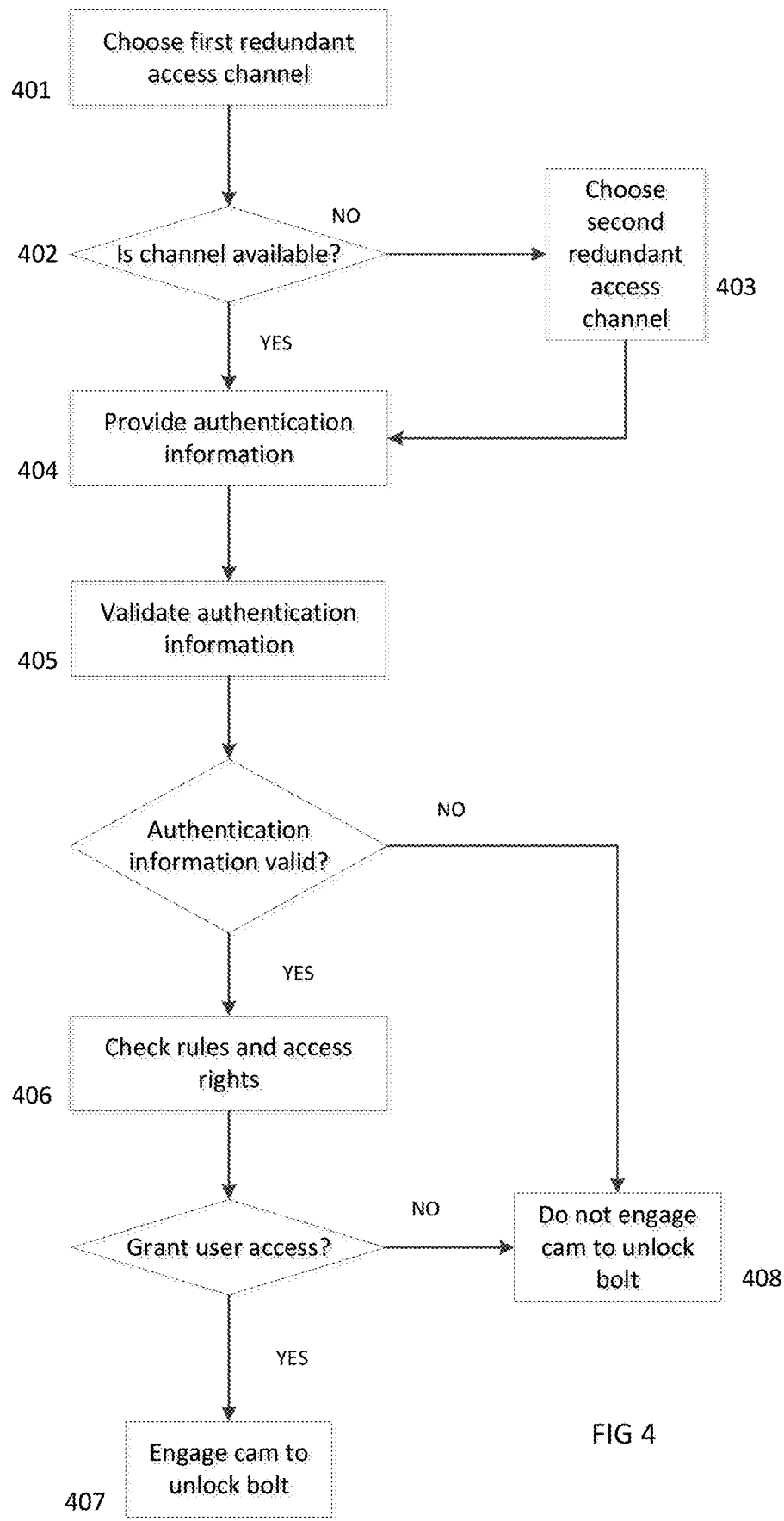
FIG. 4 shows a process for opening a smart lock according to embodiments of the invention.

FIG. 4 shows a process for using a lock with access channels according to embodiments of the invention. In step 401, a user chooses a first access channel. If the channel is available as shown in step 402, the user may provide authentication information 404. For example, if the access channel is wirelessly transmitting a token to the smart lock, it may be determined that the access channel is unavailable if, for example, the user's mobile device is lost, stolen, or drained. If the first access channel is unavailable, then a second redundant access channel is selected 403. For example, the second redundant access channel may be a biometric scan or passcode that is entered on the smart lock's keypad.

The smart lock validates the authentication information as shown in step 405. As described above, if the authentication information includes a token or passcode, the token or passcode is compared to a token or passcode produced by a process stored on the smart lock. If the authentication information is a biometric scan, then the scanned data is compared to biometric data stored at the smart lock. In this way, the invention provides redundant channels of access that ensures users can access a lock even when their mobile device is lost or inoperable.

If the authentication information is validated, then the access rights are checked to determine whether the user is authorized to access the smart lock, as shown in step 406. For example, it is determined whether the master or administrator allowed the user access to a smart lock at the given day or time. If the user is authorized to open the lock, then the user is granted access, and the button may engage the cam to open the smart lock 407. If the authentication information is not valid, or the master or administrator decided to deny the user access to the lock, the button will not engage the cam and open the smart lock 408. As described above, the rules and access rights may be checked at the user device, the central access server, the master device, or the administrator device.

Figure 5:
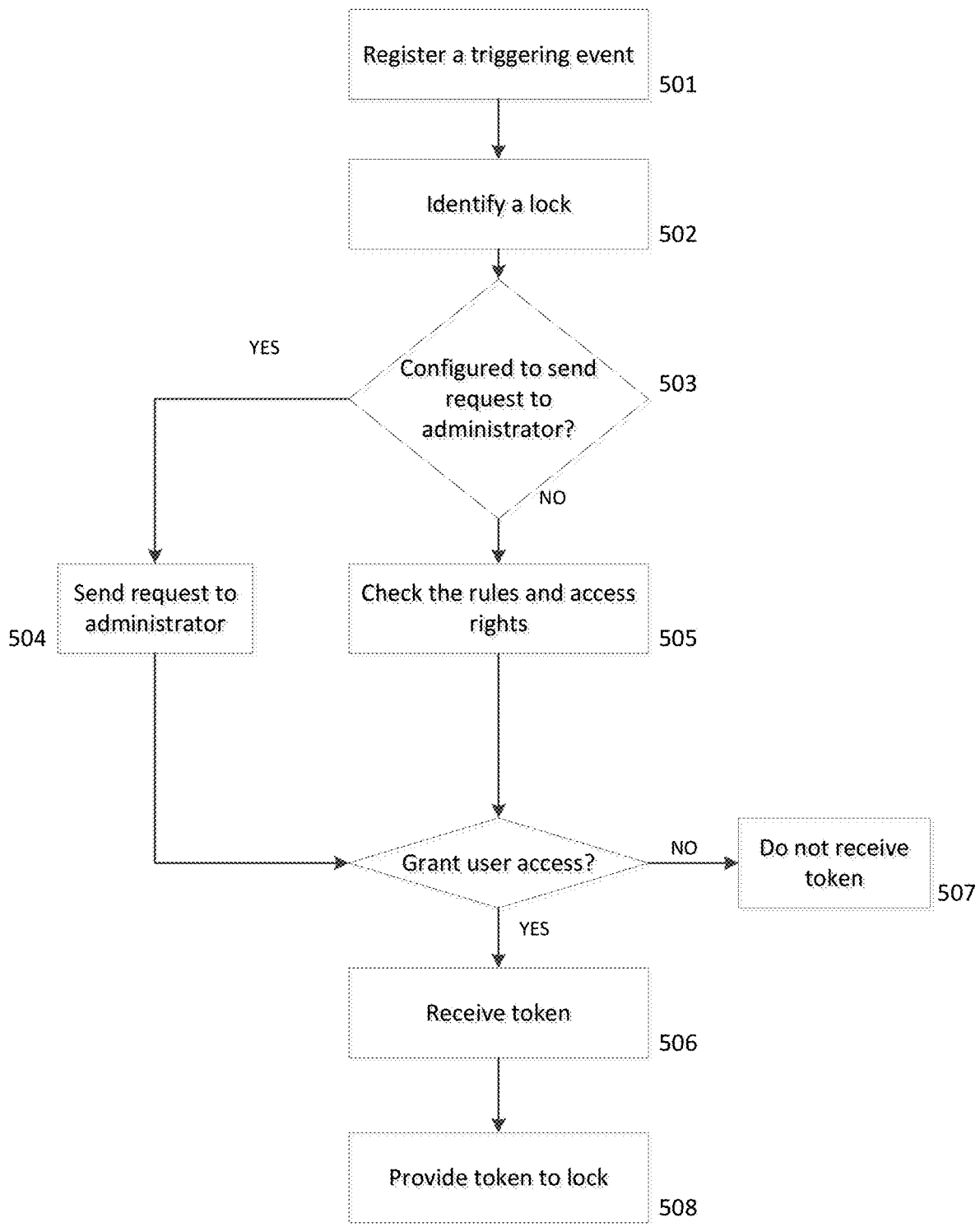
FIG. 5 shows a process for registering triggering events in an access control system according to embodiments of the invention.

FIG. 5 shows a process for controlling a lock with access channels according to embodiments of the invention. In step 501, a triggering event is registered. Triggering events may be used to initiate the process of opening a smart lock automatically. A triggering event may be for example, when a user's mobile device has come within a predetermined distance (e.g., 10 feet) of the smart lock. The triggering event may then, for example, cause the mobile device to automatically transmit a token to the button.

Triggering events may be registered based on other capabilities of the mobile device. For example, if the mobile device has gesture recognition sensors and software, a triggering event may be registered based on when the user shakes his or her mobile device in a particular way. Alternatively, the mobile device may register a triggering event when the user selects a button or enters a code on a mobile application on the mobile device.

After the mobile device registers a triggering event, the mobile device identifies the smart lock it is opening, as shown in step 502. It is then determined whether the rules are configured to grant the user conditional access rights or fixed access rights, as shown in step 503. If the user has conditional access rights, then the mobile device will submit a request to the master or administrator as shown in step 504. Otherwise, the rules and access rights are evaluated to determine if the user is authorized to open the lock at step 505.

As described above, a mobile device may submit a request to an administrator in several ways. For example, the mobile device may submit a request to a master device, an administrator device, or a central server using its data connection, by sending a text message, or by placing a call to the central access server with a call center. In some embodiments of the invention, the master, administrator, or central access sever may require the user provide additional credentials before issuing a token. For example, the request submitted by the user's mobile device may include the user's location, password, or other similar identifying credentials, such as their phone number or email address. As another example, the additional credentials may include the GPS coordinates of the user's mobile device that corroborate that the user is at the location of the smart lock. In other embodiments, the user may also be required to take a picture of the smart lock and provide it with the request to prove the user is located at the location of the smart lock. After the credentials are successfully validated, a token is sent to the user's mobile device.

If the master or administrator approves the user's request, or the user has sufficient access rights to open the lock, then the user may receive a token as shown in step 506. If the master or administrator denies the user's request, or the user is unauthorized to open the lock, the user will not receive a token, as shown in step 507.

The user may then provide authentication information to the smart lock, as shown in step 508. If the user will be opening the lock by entering a passcode on the keypad, the user may for example, receive the passcode as a text message, or displayed on a mobile application, which the user can enter on the smart lock keypad. If the user's mobile device will be wirelessly transmitting the token to the smart lock, then the mobile device may transmit the token automatically, once it is received.

In one aspect of the invention, additional layers of security may be required before the authentication information may be provided to the smart lock. For example, a user may be prompted to enter a password into the mobile device before it will wirelessly transmit the authentication information to the button. In other embodiments, the rules may be configured to require the user to scan his or her fingerprint on the mobile device before receiving a token. As described above, the mobile device may also automatically transmit the authentication information without further interaction from the user. For example, the mobile device may transmit the authentication information upon launching a mobile application.

In some embodiments, the button may be a part of an inter-connected hub of devices that may be controlled from a single interface and are automated based on events occurring in the access control system. For example, the inter-connected network of devices may include a home thermostat, lighting system, sound system, and access control system which communicate wirelessly over WiFi or Bluetooth. The home thermostat, lighting system, sound system, and access control system may communicate to each other or to a central server using the same Application Programming Interface ("API"). Using the API, the home thermostat, lighting system, sound system, and access control system may be automated based on certain rules or events. For example, after a user unlocks his home door with his mobile device, the access control system may communicate user preferences to the thermostat to turn on the air conditioner at a certain temperature, to turn on certain lighting fixtures in the living room, and start playing specific user-defined music over the speaker system.

Figure 6:
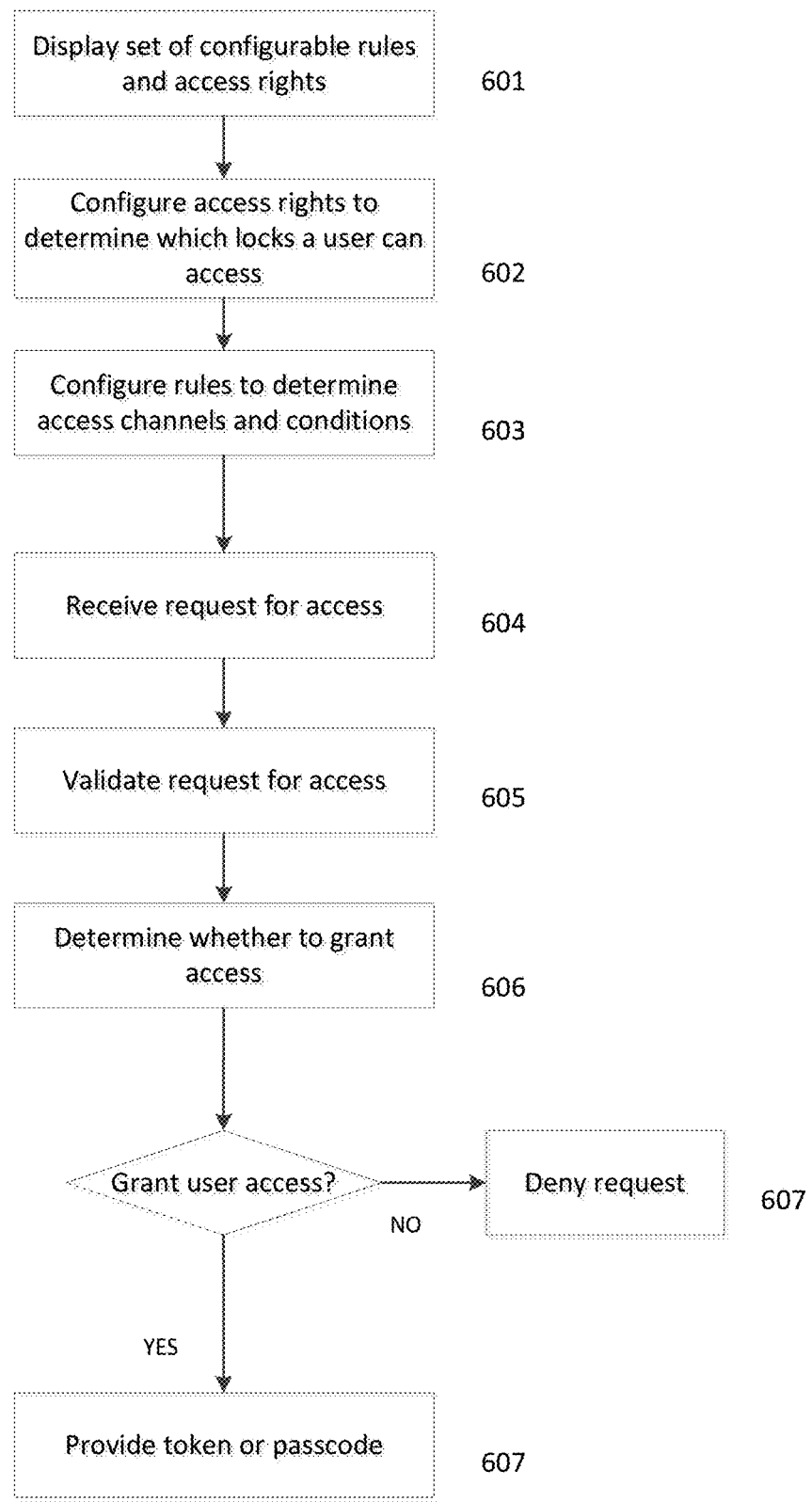
FIG. 6 shows a process for controlling access to smart locks in an access control system according to embodiments of the invention.

FIG. 6 shows a process for enabling a master or administrator to control an access control system. In step 601, a set of configurable rules and access rights is displayed to a master or administrator. In step 602, the master or administrator configures access rights to determine which smart locks a user may access. In step 603, the master or administrator configures rules that specify which access channels a user may use to open a smart lock, and what (if any) conditions must be satisfied before opening the smart lock.

When a user who has conditional access rights submits a request to open a smart lock as described above, a master or administrator receives a request for access, as shown in step 604. For example, a request may be received in the form of a text message, phone call, or as a notification displayed on a mobile application of the master or administrator. The request may be received directly from a user, or it may be received from the central access server, which received the request from the user.

In step 605, the user request is validated. The user may be validated by, for example, requesting the user provide additional credentials, such as a password. As another example, the master or administrator may obtain the ID of the user's mobile device to determine if the mobile device has been reported as lost or stolen. If it is stolen, the rules may be configured to automatically deny the request for access and notify the master, administrator, or user of the attempted use.

If the master or administrator validates the user, then the master or administrator may proceed to step 606, where the master or administrator determines whether to grant access to the user. In this step, the rules and access rights may be checked to determine if the user is authorized to open the particular lock and if there are any conditions that must be met before opening the lock. For example, it may be determined that the user is not authorized to open the particular smart lock, or is not authorized to open the smart lock on the particular day. If the user is authorized, the master or administrator may still decide to deny the user access. For example, a master or administrator may prefer to use his or her discretion in approving requests even if the user is authorized. If the master or administrator determines to approve the request, then a token or passcode is generated and provided to the user. The token or passcode may be transmitted to the user as described above. For example, the token or passcode may be sent in the form of a text message, phone call, or as a notification displayed on a mobile application of the user. The token or passcode may then be provided to the user at step 608.

According to some embodiments of the invention, a mobile application may be installed on the master device, administrator device, or user's device, for controlling an using the access control system. The mobile application for masters or administrators may provide an interface to: view access information; create access rights; view access logs; manage user rights; open a lock; and create reports of successful entries, and refused entries, including details of why entry was refused (e.g., the user accessed the lock outside of the timeframe or date it was permitted to access the lock, or was not allowed to open the lock in the first instance). In this way, the access control system provides the safety and reliability benefits of a mechanical lock and key system, while also providing the reporting and real-time value-added services of mobile devices and electronic lock systems. Similarly, the mobile application for users may provide an interface to: receive access alerts; request access rights; view access logs; and open a lock.

Figure 7A:
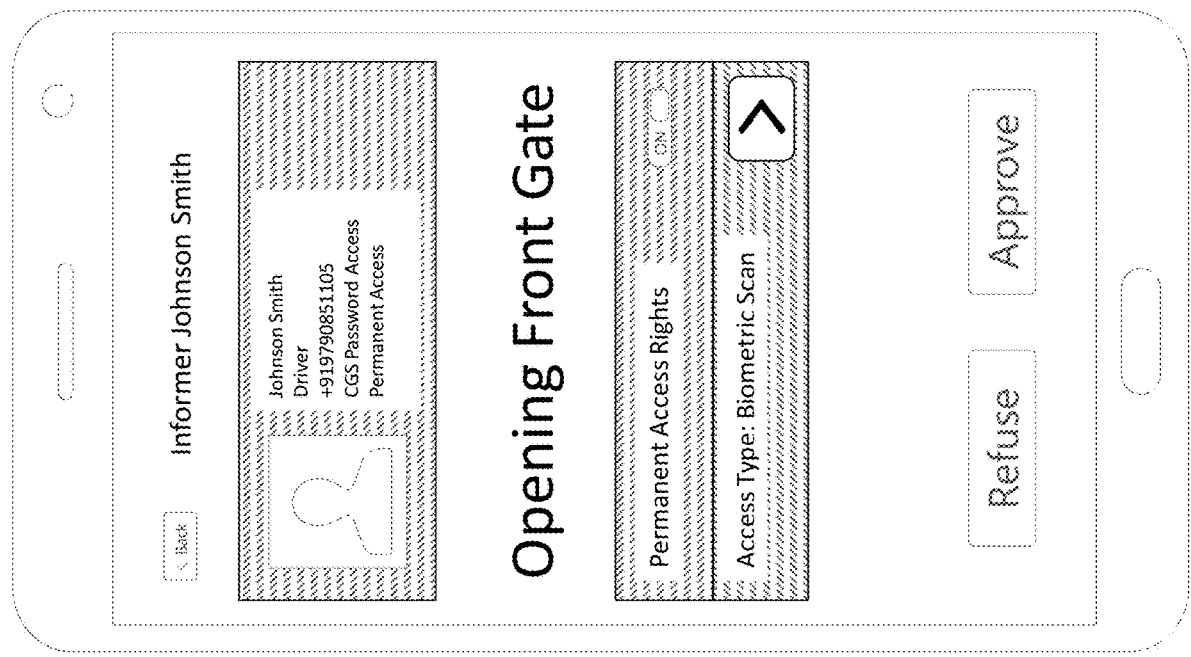
FIGS. 7A, 7B, 7C, 7D, and 7E show interfaces for controlling access to smart locks in an access control system according to embodiments of the invention.

In one aspect of the invention, the mobile application provides an "informer" feature as shown in FIG. 7A, which informs masters, administrators, and users about information related to access events and access rights. For masters and administrators, the mobile application will receive information about access events, such as when a user accesses a lock. As shown in FIG. 7A, the feature provides an alert to the master or administrator that Johnson Smith wishes to open a gate, is in close proximity to a gate, or is attempting to open a gate. The alert notifies the master or administrator of the access event or change in access rights in near real-time. Because the events can be communicated quickly to the master or administrator, the mobile application may additionally provide the master or administrator the option to deny the user from accessing the secured site in near real-time. Similarly, the mobile application may also receive alerts when a user attempts to open a lock with invalid authentication information (e.g., an incorrect passcode).

Using the wireless or location-based capabilities of the mobile device, the mobile application can determine the length of time that a user stays at a secured site. The mobile application may also receive information from the button about when it was locked and unlocked to determine when the user gained access and subsequently left a secured site. As explained in more detail below, the button on the lock will also transmit its lock/unlock status to a user's mobile device. The user's mobile device may then transmit the lock/unlock status to the central access server, which may then send a notification to a master or administrator about the status of the lock. In this way, after a user has subsequently left a secured site, a master or administrator may be alerted that the site is still unlocked, and may contact the user informing him or her that they forgot to lock the site.

Figure 7B:
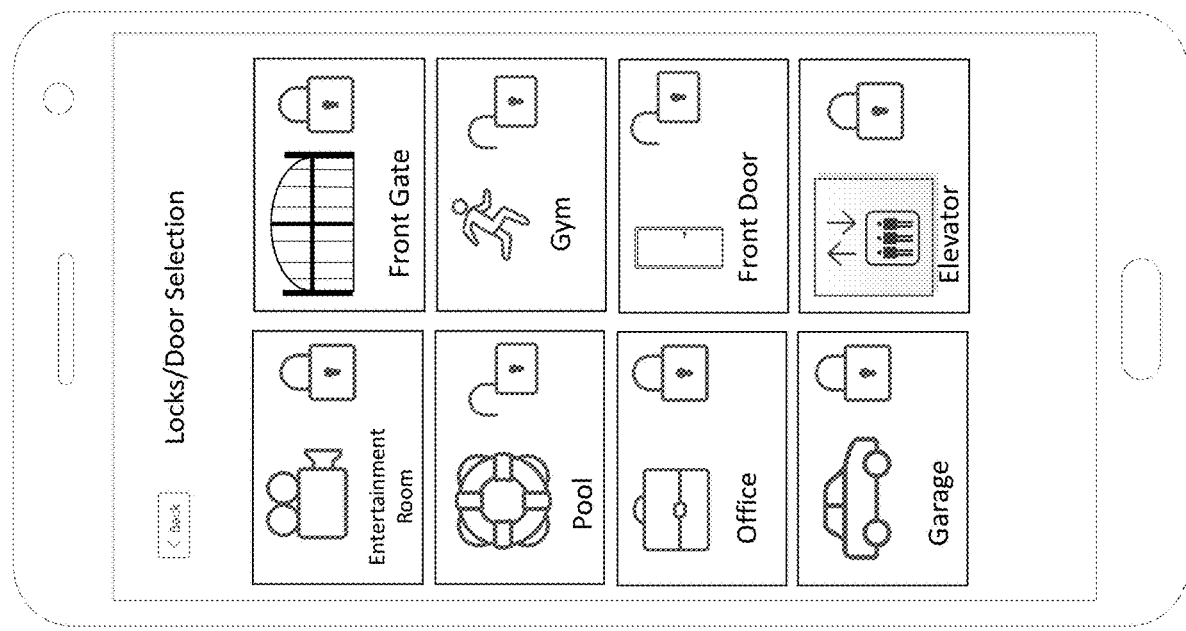

In one aspect of the invention, the mobile application may display to a master or administrator which areas of a secured site have been locked or unlocked, as shown in FIG. 7B. When a user unlocks or locks a site with their mobile device, the mobile device communicates the information to the central access server. The central access server then provides the lock/unlock status to masters or administrators. When the user locks or unlocks a site using an alternative channel of access, the information is stored on the smart lock and communicated to the central access server the next time a mobile device is used to open the smart lock.

Figure 7C:
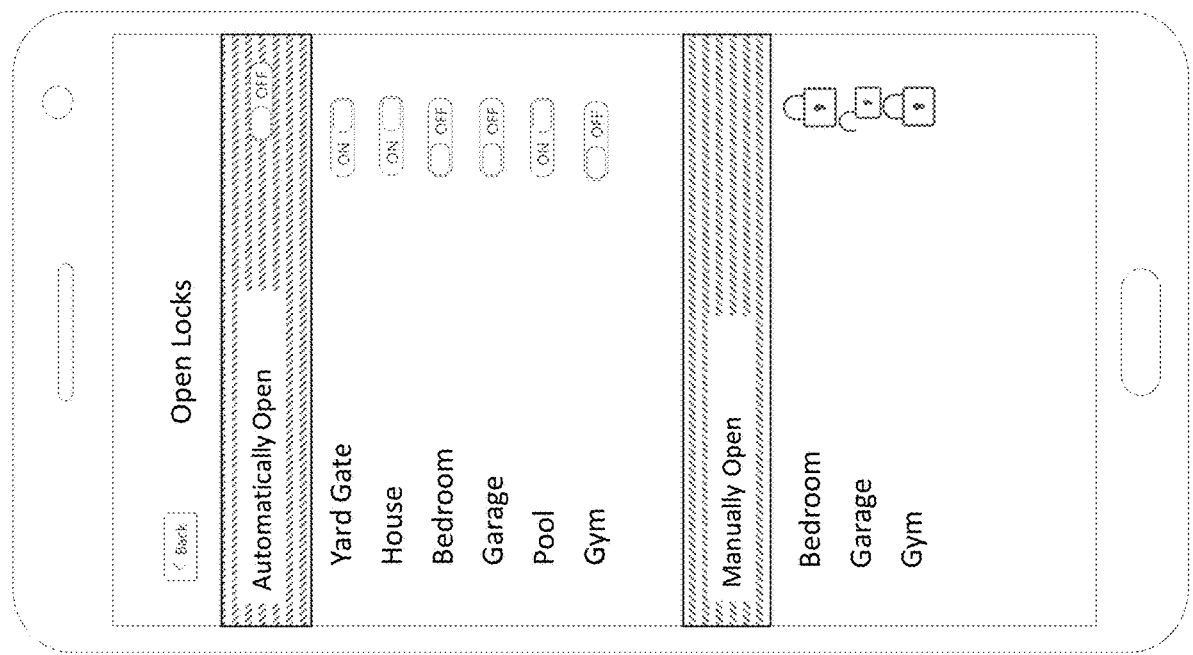

The mobile application is also programmed to provide a user interface for displaying and configuring how these sites may be unlocked. For example, as shown in FIG. 7C, the mobile application can show whether a site may be opened automatically or manually.

Figure 7D:
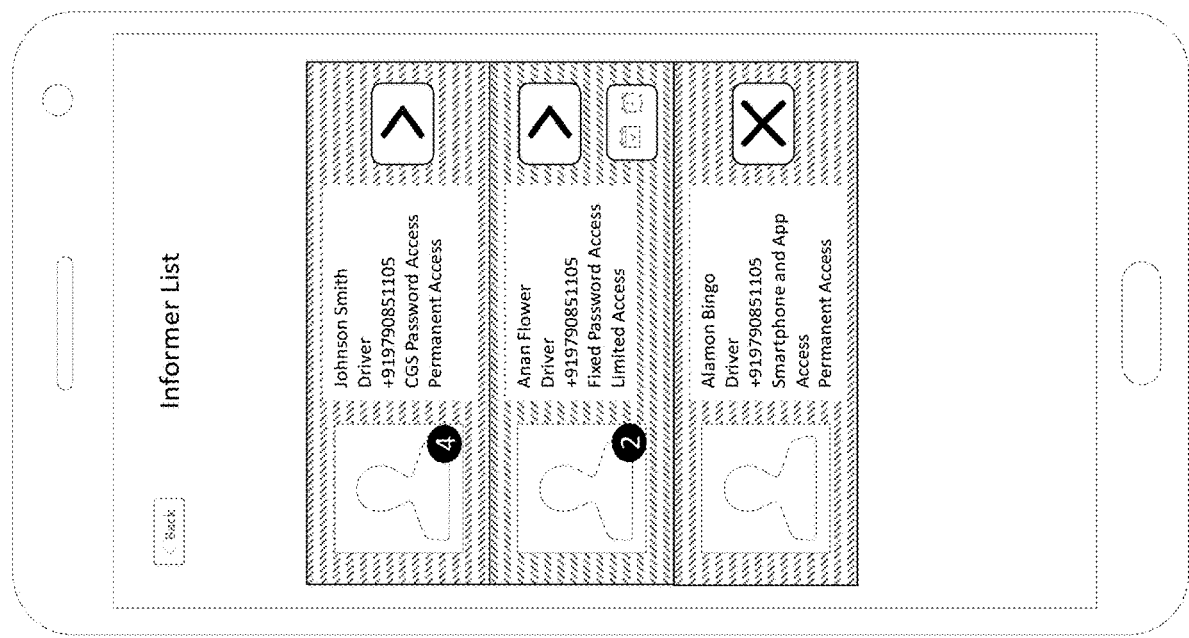

Another interface of the mobile application provides a display of which users have access to a lock. As shown in FIG. 7D, the interface displays a picture of each user, and their personal information such as name and contact information. Each user on the list may be selected or deleted. Selecting the user causes the mobile application to display another interface that shows additional details about the user.

Figure 7E:
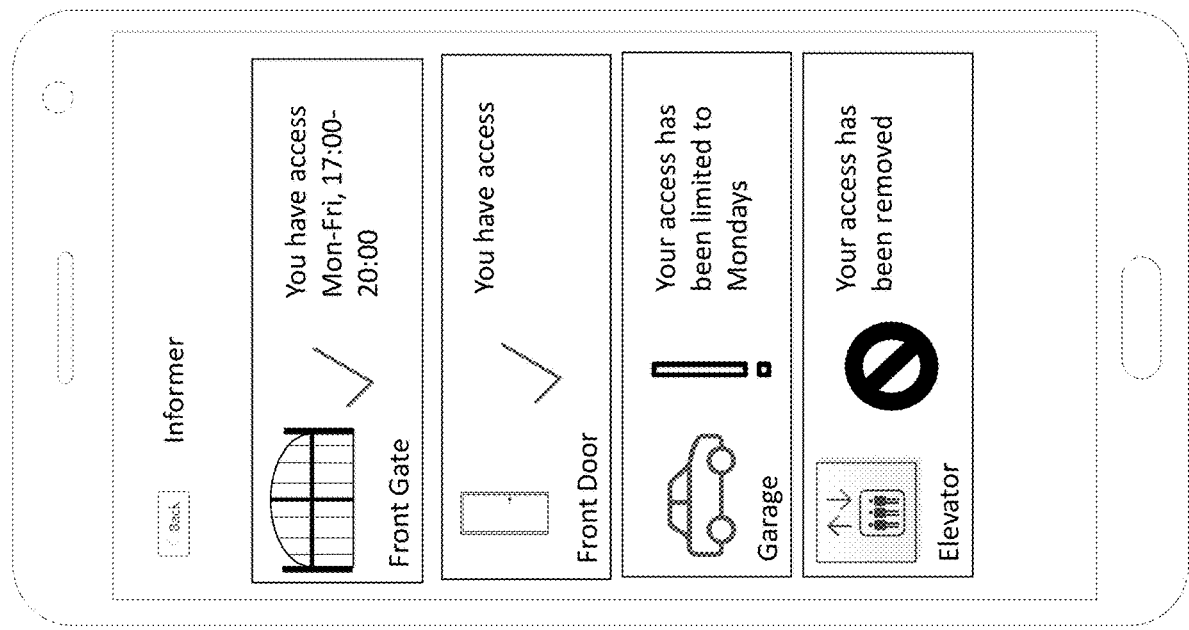

In one aspect of the invention, the informer will display alerts and messages in connection with changes made to a user's access rights. As shown in FIG. 7E, the informer may alert a user that he or she has access rights to a particular site (e.g., Gate A) at a specific time (e.g., from Monday to Friday from 5:00 pm to 8:00 pm). Similarly, the informer may notify the user that he or she received new access rights to a particular area, or that those access rights have been limited, or revoked.

While FIGS. 7A-7E demonstrate the alert and messaging functionality of the informer using the mobile application interface, alerts and messages regarding access rights may also be communicated to the users via SMS text, e-mail, or by a phone call. Thus, for example, when user access rights change, the user may receive an SMS text informing the user his or her access rights have been changed.

In one aspect of the invention, the mobile application provides an "authorization" feature, which enables masters and administrators to create and change users' access rights, and allows users to request access rights. Access rights for each user are stored in the master device, administrator device, or central access server, where each user's attempt to access a lock may be validated.

Figure 8A:
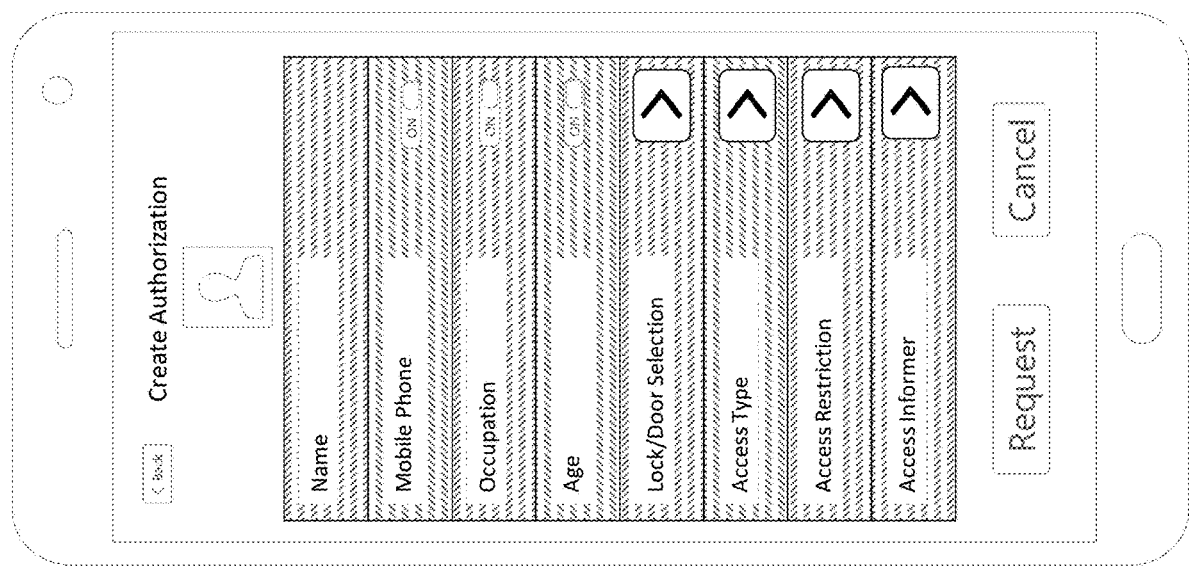
FIGS. 8A, 8B, 8C, 8D, 8E, and 8F show interfaces for controlling to smart locks in an access control system according to embodiments of the invention.

As shown in FIG. 8A, the mobile application may provide an interface for masters or administrators to create user access rights and rules. For example, the interface allows the master or administrator to specify the user's contact information (e.g., name, phone number, occupation, age), the particular individual locks that the user will have access to, the access channels the user may use (e.g., passcode, biometric scan, wirelessly transmitting a token to the smart lock, or any combination of thereof), and conditions to the user's access (e.g., restrictions on the time of the day). The authorization feature of the mobile application is available to masters and administrators. In some embodiments of the authorization feature used by administrators, after providing the access information the administrator submits the information as a request to the master. The information is then communicated to a master who ultimately approves or denies the creation of access rights for the new user. The creation of access rights may happen in near real-time; when a master approves a user's request or an administrator's request, the user may immediately begin using their mobile device, passcode, or biometric scan to access the designated smart locks.

Figure 8B:
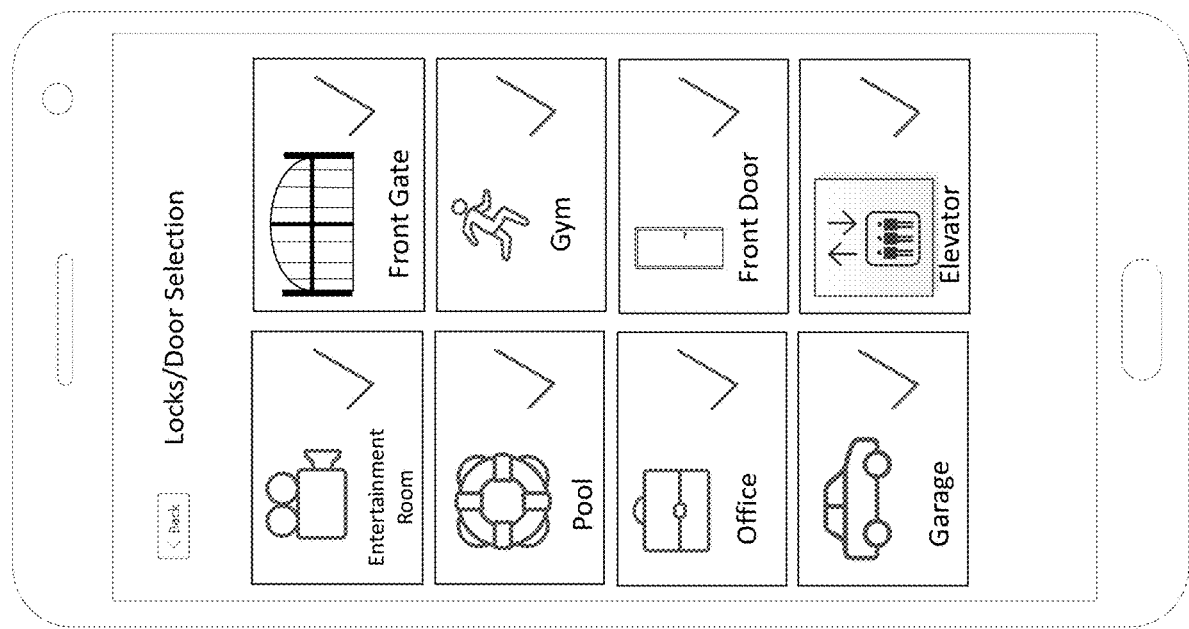

In one aspect of the invention, the master or administrator can specify a particular lock, area, or door within a site, as shown in FIG. 8B. As FIG. 8B shows, a master or administrator can select locked areas such as a front gate, gym, entertainment room, or office to grant access to a user. The mobile application enables this configuration to occur remotely and in near real-time; a master or administrator is not required to be on-site to make a key copy or update any records thereby causing delay.

Figure 8C:
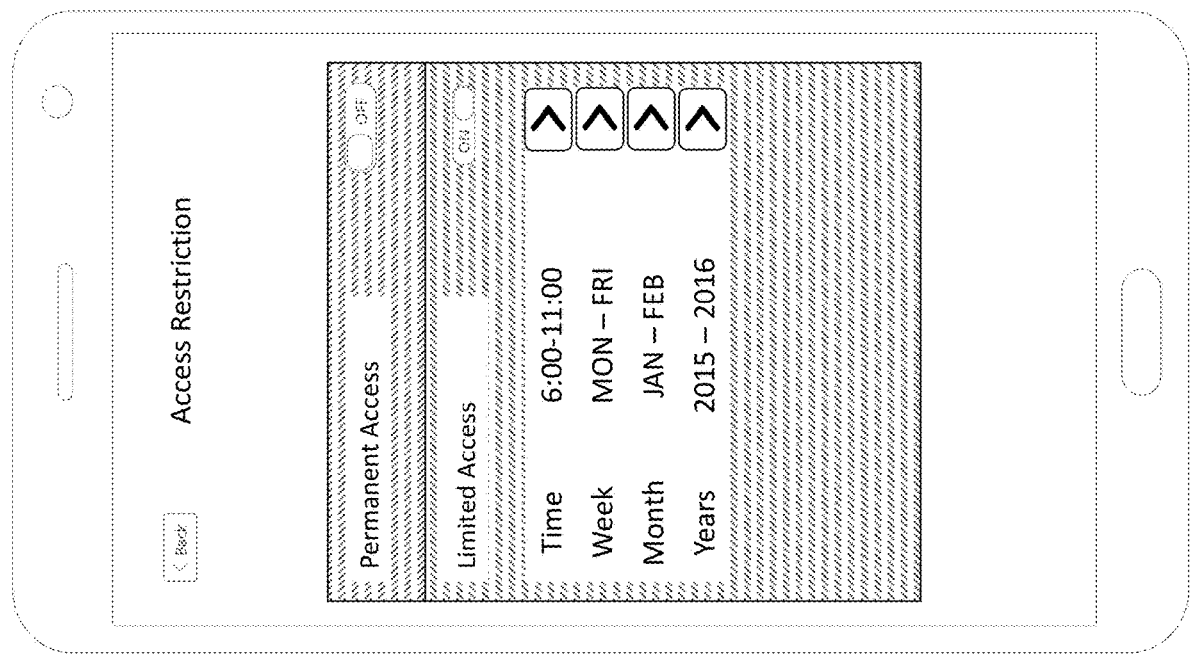

As described above, the authorization feature allows masters or administrators to add restrictions to a user's access. As shown in FIG. 8C, a master or administrator may allow a user to have permanent indefinite access, or may limit the user's access to be temporary, or may limit the access to be during select intervals throughout the day, week, month, or year.

The authorization feature may additionally allow a master or administrator to provide one-time access on a case-by-case basis. A user may receive one-time access by sending a request to a master or administrator as described above. The request may be via the mobile application's authorization interface for users, SMS text, e-mail, or by phone call. The request can be for a particular lock or group of locks, and for a particular access type. The master or administrator may determine in near real-time to grant or deny the request. If the master or administrator approves the request, the user can open the lock. Using the recording and reporting functionality the master or administrator can determine when the user has finished using the lock, and disable or remove the user's access rights. Alternatively, if the master or administrator decides to grant the user access, the master or administrator may provide the user with a dynamic passcode that can only be used once, and expires after it has been used.

Figure 8D:
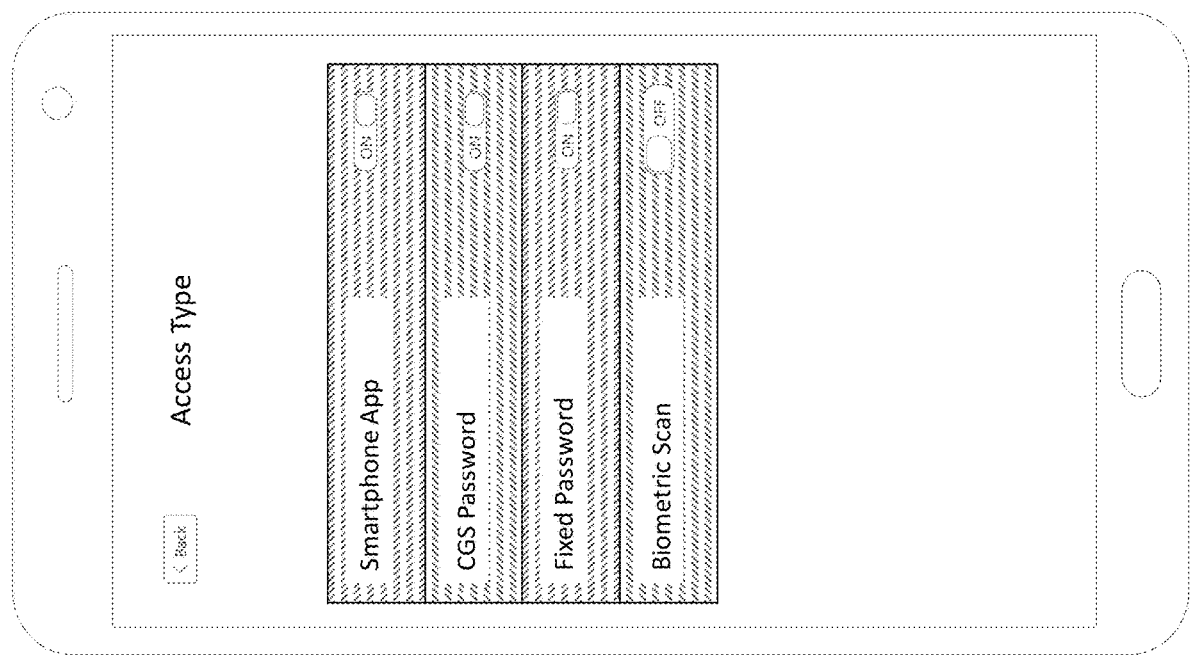

An access type interface, as shown in FIG. 8D allows a master or administrator to configure the rules to specify what access channels are available to a user for opening a smart lock. For example, the master or administrator can specify whether the user can open a smart lock by wirelessly transmitting a token to the smart lock, entering a passcode on the keypad, using a biometric scan, or any combination thereof. The master or administrator may also add conditions limiting when a user may access a smart lock, such as, adding time or date restrictions. For example, a master or administrator may specify that a user can access a lock with a smartphone or mobile device Monday through Friday, but on weekends must additionally provide a biometric scan or passcode.

In one embodiment of the invention, a master or administrator may add a user's biometric scan to a smart lock using their respective mobile devices. For example, a user may scan their fingerprint on their smartphone and send it to the master or administrator via SMS text or the mobile app. The master or administrator may then add the fingerprints to the central access server, or the smart lock the next time their mobile device communicates to the smart lock. In this way, a new user's biometric scan can be added to a smart lock remotely, without the user previously being located at the smart lock.

A user may send a request for access rights using the mobile application on their mobile device. After registering, the user may load a list of sites and their corresponding locks and request access from the smart lock's corresponding master or administrator. The user may search for a master or administrator and request access rights directly from them. As an alternative to using the mobile application, the user may request access by SMS text, e-mail or by phone call.

Figure 8E:
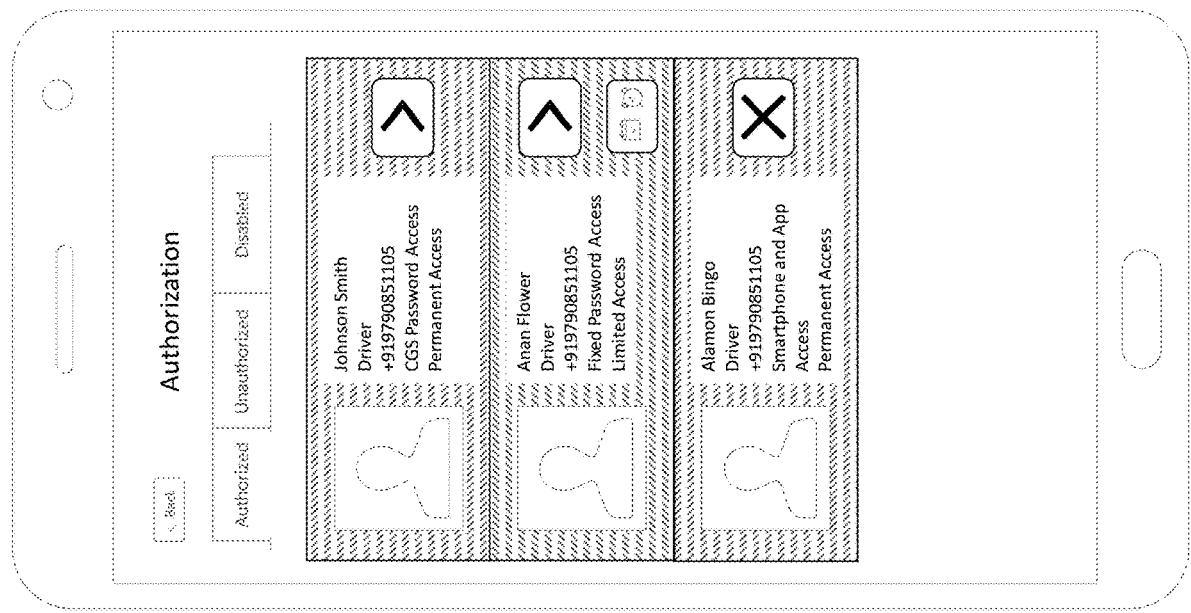

A master or administrator may modify the access rights of each user through the authorization interface at any time, as shown in FIG. 8E. In one aspect of the invention, the access rights may be modified without notifying or informing the users. In this way, the master or administrator may change or delete the access rights associated with a mobile device remotely and without requiring any access or interaction with the user. Thus, if a mobile device is stolen or lost, a master or administrator may disable that particular mobile device, preventing it from being used by unauthorized persons or in unwanted manners. Before a mobile device may be disabled, the master or administrator may be prompted for additional credentials to authenticate his or her identity. If the disabled phone is subsequently used to access a smart lock (e.g., by a thief or an unwanted person), the smart lock will reject it and the master or administrator will be informed of the unauthorized attempt at access. As shown in the exemplary illustration below, the authorization interface allows masters or administrators to de-authorize users, disable users or remove them from a lock altogether. These changes to a user's access rights can be effectuated in near real-time.

In one aspect of the invention, the mobile application provides a "reporting" feature, which enables masters and administrators to view records and logs of access events for each user or each lock. Records of various access events, such as when and how a user sought or obtained access to a smart lock, may be stored in the storage medium of the button as described above or in the mobile application of the of the user's mobile device. For example, when a user seeks or obtains access to a smart lock using his or her mobile device, a record of that access event may be stored in the mobile device or in the button. Similarly, if the user is accessing the smart lock via a redundant access channel (e.g., a passcode or biometric scan), the access event may be stored in the button, and will be wirelessly communicated to the central access server at a later stage when another mobile device is in contact with the smart lock.

Figure 8F:
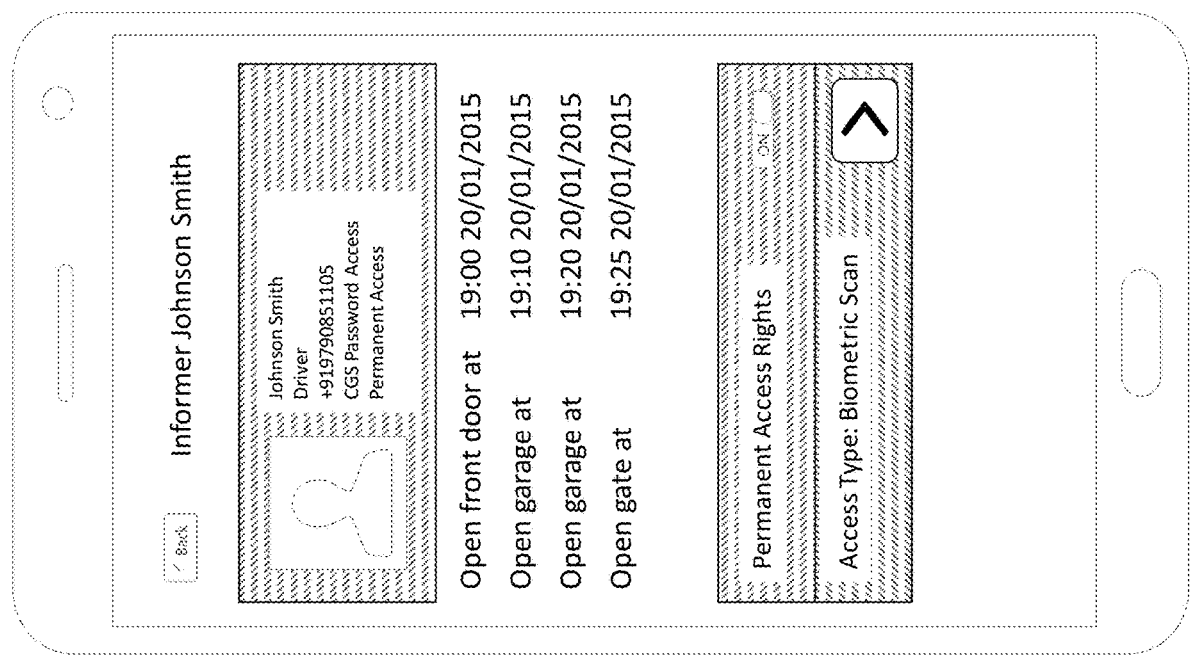

Logs of the access events for each user or each smart lock may be compiled and communicated to a master or administrator on a periodic basis, or in near real-time. For example, as shown in FIG. 8F, a log of a user's access events for the day may be compiled and reported to a master or administrator. The logs show the details of each access event for a particular user, such as what smart lock was accessed, how it was accessed, and the precise time the user accessed it and how long the user spent on site. Logs can further include records of successful and unsuccessful openings of smart locks, the time periods that users are allowed to open smart locks, and when users requested access to smart locks. Similar logs can be compiled for each smart lock, reporting who accessed the smart lock, how it was accessed, and when it was accessed. Masters and administrators can configure how frequently they prefer to receive reports of logs. Reports can be communicated to the central access server, or communicated directly to a master or administrator.

In one aspect of the invention, the logs and reports may be processed to discover patterns about access usage and users. Specifically, the logs and reports can be mined to detect patterns relating to how and when users access different smart locks. Using these recognized patterns of access behavior, the access control system may then predict access events to enhance system security or access control. For example, if the logs and reports indicate that a user enters a home from the front gate at 5:00 pm every weekday, the access control system may automate processes or tasks in inter-connected devices, such as communicate to the lighting system to activate the lights on the front patio, the thermostat to start the air conditioner.

Figure 9A:
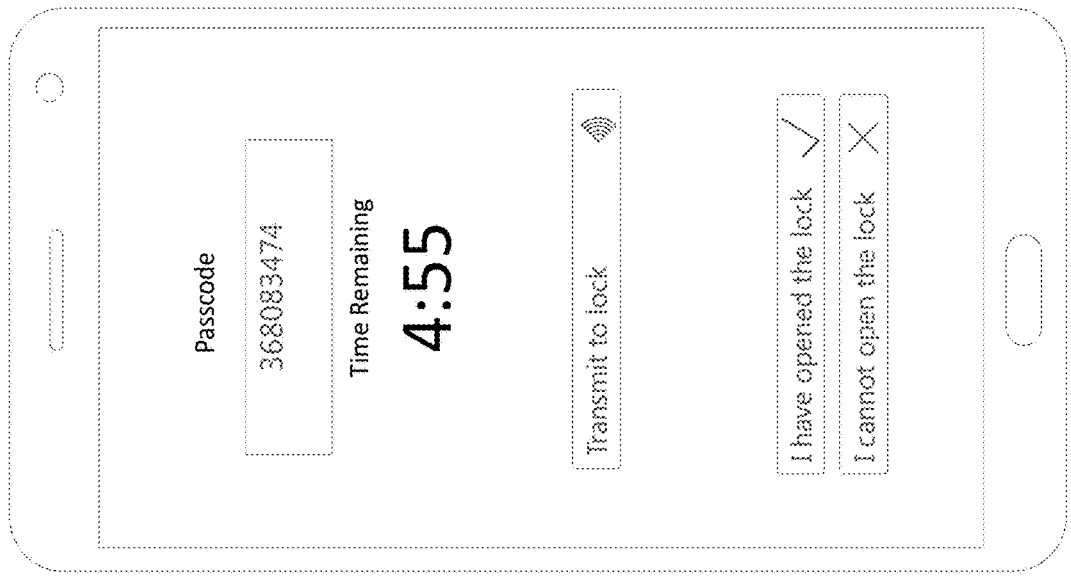
FIGS. 9A, 9B, and 9C show user interfaces for accessing smart locks in an access control system according to embodiments of the invention.
Figure 9B:
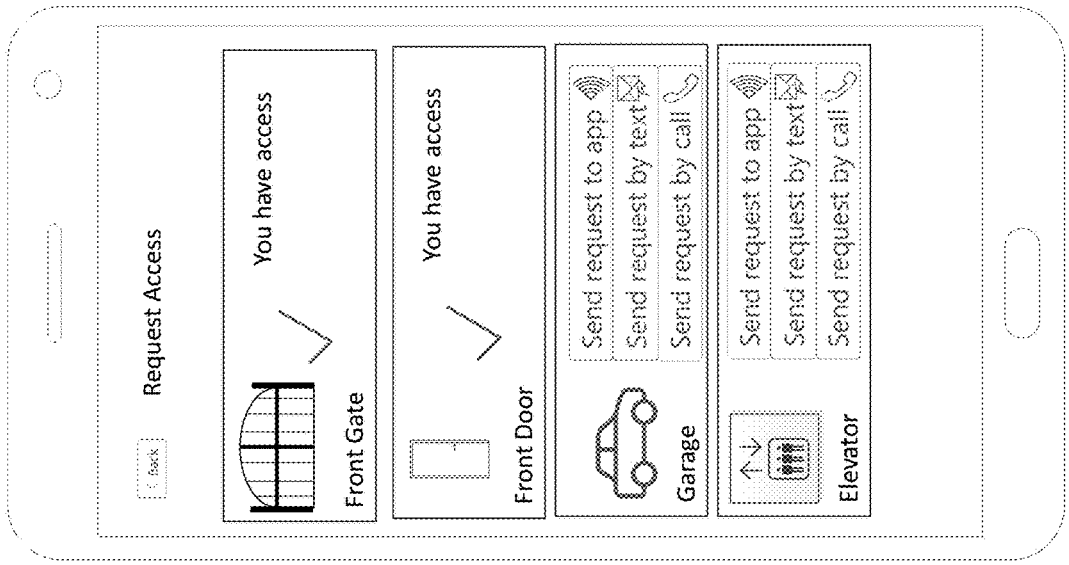
Figure 9C:
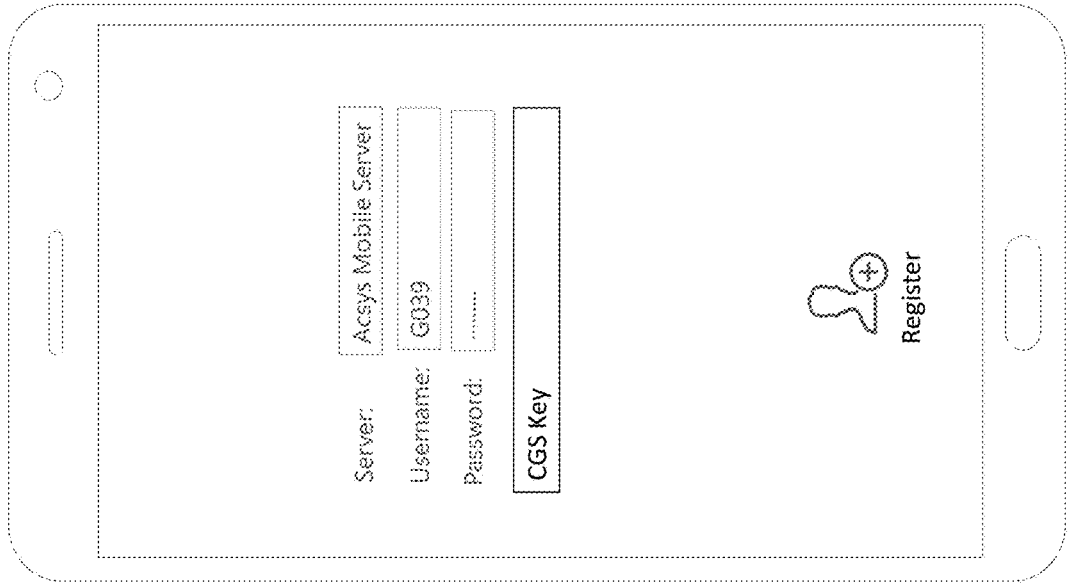

FIGS. 9A-9C illustrate user interfaces for logging into the mobile application, requesting a token or passcode, and receiving a token or passcode. As described above, a user may be required to provide credentials as shown in FIG. 9A, such as a password, before being allowed to request a token or passcode. As shown in FIG. 9B, the interface allows the user to view which smart locks they may access, and if they do not have access to a smart lock, or only have conditional access rights, they may submit a request to a master or administrator. As FIG. 9B shows, a user may submit the request in several ways, such as for example, by sending an alert to the mobile application on the mobile device of the master or administrator, or by sending them a text or placing a call. As shown in FIG. 9C, if the user has been validated and approved for access by a master or administrator, the user will receive a token or passcode. If the user receives a passcode, they passcode may be displayed for the user to enter onto the keypad. If the user receives a token, the token may be wirelessly transmitted to a smart lock.

Variations, modifications, and other implementations of what is described herein may occur to those of ordinary skill in the art without departing from the spirit and scope of the present invention and its claims.

What is claimed is:

1. A lock comprising:
    a plurality of redundant access channels for receiving authentication information, the redundant access channels comprising two or more of the group of access channels consisting of: a biometric scanner, a passcode keypad, and a wireless transceiver; and
    a hardware processor configured to receive and validate the authentication information received from at least one of the plurality of redundant access channels;
    wherein, in response to validating the authentication information, the hardware processor is configured to unlock the lock.

2. The lock of claim 1, further comprising a button and a rechargeable power source coupled to the hardware processor, wherein the button is a freely rotating button configured to energize the rechargeable power source when the button is rotated, and wherein the rotational energy generated by the movement of the button is converted to electric energy and stored in the rechargeable power source.

3. The lock of claim 2, further comprising a piezo element, wherein the rotational movement of the button is applied to the piezo element and generates the electric energy that is stored in the rechargeable power source.

4. The lock of claim 2, further comprising an armature and electrical generator, wherein the rotational movement of the button is applied to the armature and electrical generator to generate the electric energy that is stored in the rechargeable power source.

5. The lock of claim 1, wherein:
    a user is allowed access to the lock in response to validating the authentication information received through a first channel of the plurality of redundant access channels; and
    if the user is not allowed access to the lock through the first channel, the user is allowed access to the lock upon validation of authentication information received through a second channel of the plurality of redundant access channels.

6. The lock of claim 1, wherein access to an inter-connected hub of devices is granted in response to validating the authentication information, wherein the inter-connected hub of devices comprises at least one of a thermostat, a lighting system, and a sound system.

7. A system comprising:
    the lock according to claim 1;
    a user device configured to request access to the lock and communicate with the hardware processor through the wireless transceiver; and
    an administrator device for controlling access to the lock, the administrator device being configured to grant or deny the request for access by providing the user device valid authentication information.

8. The system of claim 7, wherein the administrator device is configured to grant access to the user device based on: a set of rules that comprises a user role that is associated with a set of permissions to one or more locks, and a triggering event.

9. A method for providing access to a lock, the method comprising the steps of:
    providing user authentication information to the lock to obtain access through a first redundant access channel of a plurality of redundant access channels, the plurality of redundant access channels comprising two or more of the group of access channels consisting of: a biometric scanner, a passcode keypad, and a wireless transceiver; and
    receiving a response from the lock regarding whether the user's authentication information was validated.

10. The method of claim 9, wherein the step of providing user authentication information further comprises one of:
    sending a request from a mobile device of the user; and
    receiving a token at the mobile device of the user and providing the token to the lock.

11. The method of claim 10, wherein the step of sending a request from the mobile device comprises one of:
    sending a message to an administrator;
    placing a call to an administrator; and
    sending a notification to an application on an administrator's device over a network connection.

12. The method of claim 11, further comprising the step of prompting the user for additional authentication information.

13. The method of claim 10, wherein the token is a dynamic passcode based on the IMEI of the user device, the network ID of the user device, or both.

14. The method of claim 10, wherein the response from the lock comprises an access record indicating whether the token was accepted by the lock and that the lock was opened.

15. The method of claim 9, further comprising the step of automatically notifying an administrator when the user attempts to access the lock.

16. The method of claim 10, wherein the mobile device automatically receives the token and transmits it to the wireless transceiver of the lock.

17. The method of claim 9, further comprising the step of requesting activation of an inter-connected hub of devices.

18. A method for controlling access to a lock, the method comprising the steps of:
    displaying a set of configurable rules to an administrator to control access to the lock by providing authentication information that can be validated through a first redundant access channel of a plurality of redundant access channels, the plurality of redundant access channels comprising two or more of the group of access channels consisting of: a biometric scanner, a passcode keypad, and a wireless transceiver; and
    receiving a selection from the administrator as to which of the set of configurable rules need to be satisfied in order to provide valid authentication information.

19. The method of claim 18, further comprising the steps of:
   registering a triggering event; and
   determining whether a user has rights to access the lock based on the received selection from the administrator and the triggering event.

20. The method of claim 19, wherein the triggering event is based on at least one of a distance to the lock and a gesture.

\* \* \* \* \*